United States Patent
Ardison et al.

(10) Patent No.: US 10,178,825 B2
(45) Date of Patent: *Jan. 15, 2019

(54) ANHYDROUS AMMONIA FERTILIZER DISTRIBUTION LINE MONITOR

(71) Applicant: Hiniker Company, Mankato, MN (US)

(72) Inventors: Paul L. Ardison, St. Peter, MN (US); David Gramling, LeCenter, MN (US); John Kusler, Vernon Center, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,657

(22) Filed: Jan. 27, 2017

(65) Prior Publication Data

US 2017/0135281 A1    May 18, 2017

Related U.S. Application Data

(63) Continuation of application No. 14/578,441, filed on Dec. 21, 2014, now Pat. No. 9,591,801, which is a continuation-in-part of application No. 14/326,330, filed on Jul. 8, 2014, now abandoned.

(51) Int. Cl.

| A01C 15/06 | (2006.01) |
|---|---|
| A01C 23/02 | (2006.01) |
| A01C 23/00 | (2006.01) |
| G01K 13/02 | (2006.01) |

(52) U.S. Cl.
CPC ............ *A01C 23/024* (2013.01); *A01C 15/06* (2013.01); *A01C 23/007* (2013.01); *G01K 13/02* (2013.01)

(58) Field of Classification Search
CPC ....... A01C 15/06; A01C 15/00; A01C 23/024; A01C 23/023; A01C 23/02; A01C 23/00; A01C 23/007; G01K 13/02; G01K 13/00
See application file for complete search history.

(56) References Cited

U.S. PATENT DOCUMENTS

| 6,067,917 A * | 5/2000 | Nimberger | A01C 23/007 |
|---|---|---|---|
| | | | 111/119 |
| 9,591,801 B2 * | 3/2017 | Ardison | A01C 23/007 |
| 2011/0139050 A1 * | 6/2011 | Lewis | A01C 1/02 |
| | | | 111/174 |

FOREIGN PATENT DOCUMENTS

JP          62026879 A  *  2/1987

* cited by examiner

*Primary Examiner* — Christopher J. Novosad
(74) *Attorney, Agent, or Firm* — Robert L. Farris

(57) ABSTRACT

The monitor system for an anhydrous ammonia fertilizer injection system includes a manifold with a plurality of discharge lines connected to soil engaging knives. A temperature sensor is mounted in each discharge line. The temperature of fertilizer in each discharge line is measures and transmitted to a microprocessor in a console. The temperature in a discharge line is compared with the average temperature in the other discharge lines. This comparison is made for each discharge line connected to a manifold to determine the temperature variations. The variations are compared to a temperature variation number provided by the operator. If an excessive variation occurs a warning is provided. A console screen graph shows which discharge line needs inspection.

5 Claims, 16 Drawing Sheets

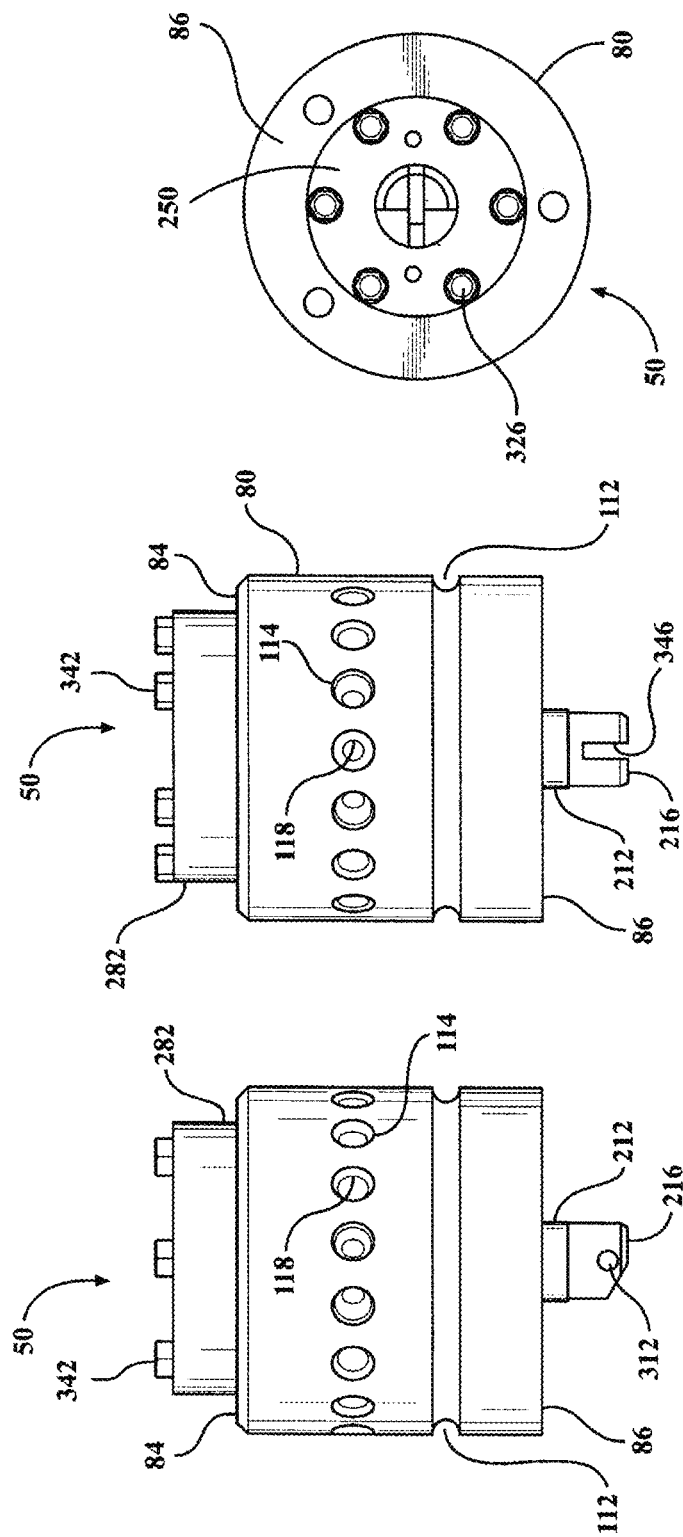

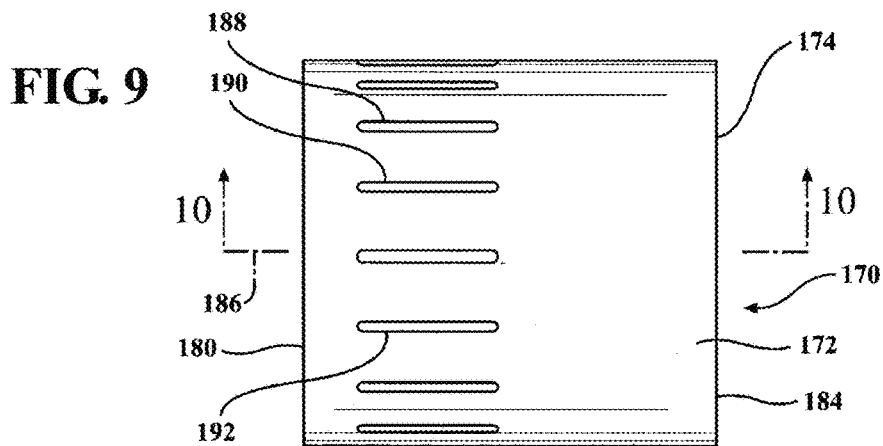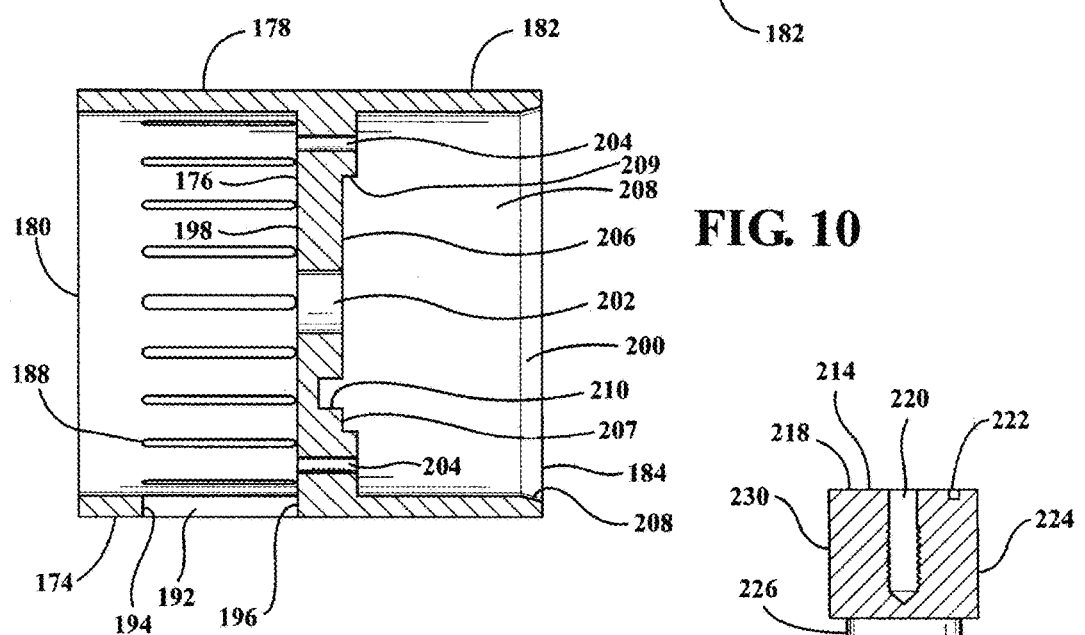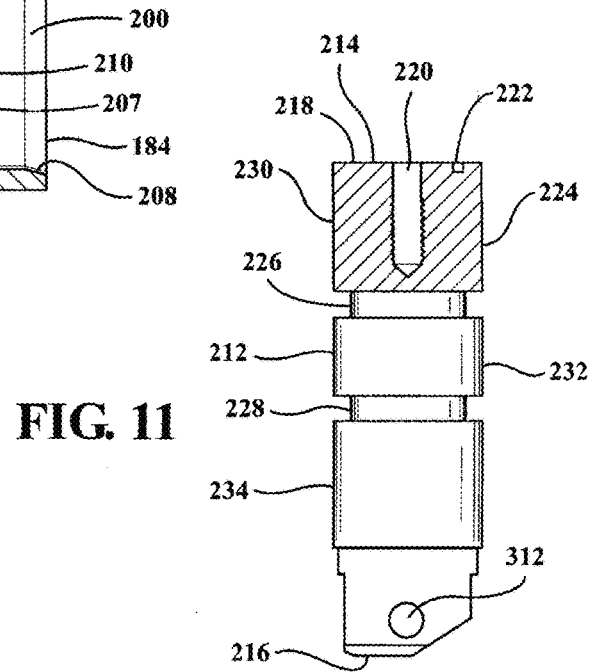

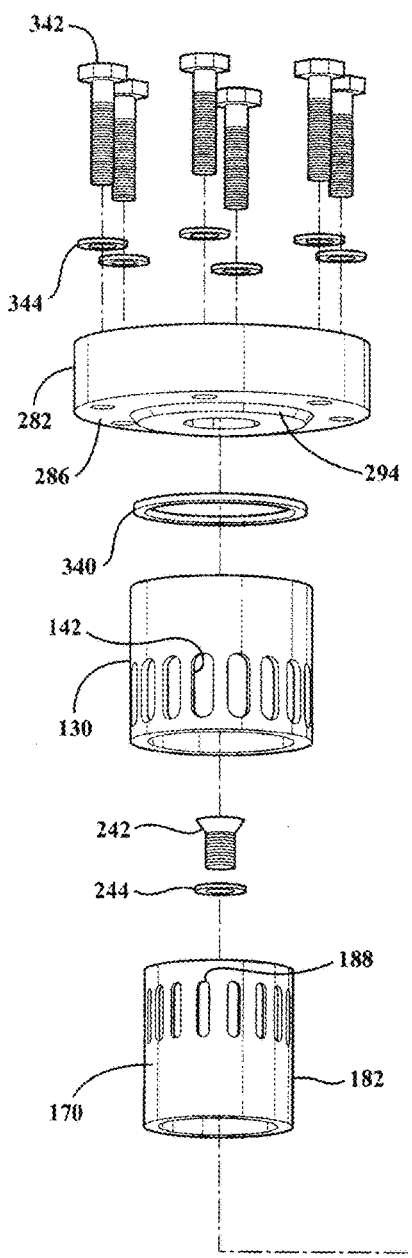
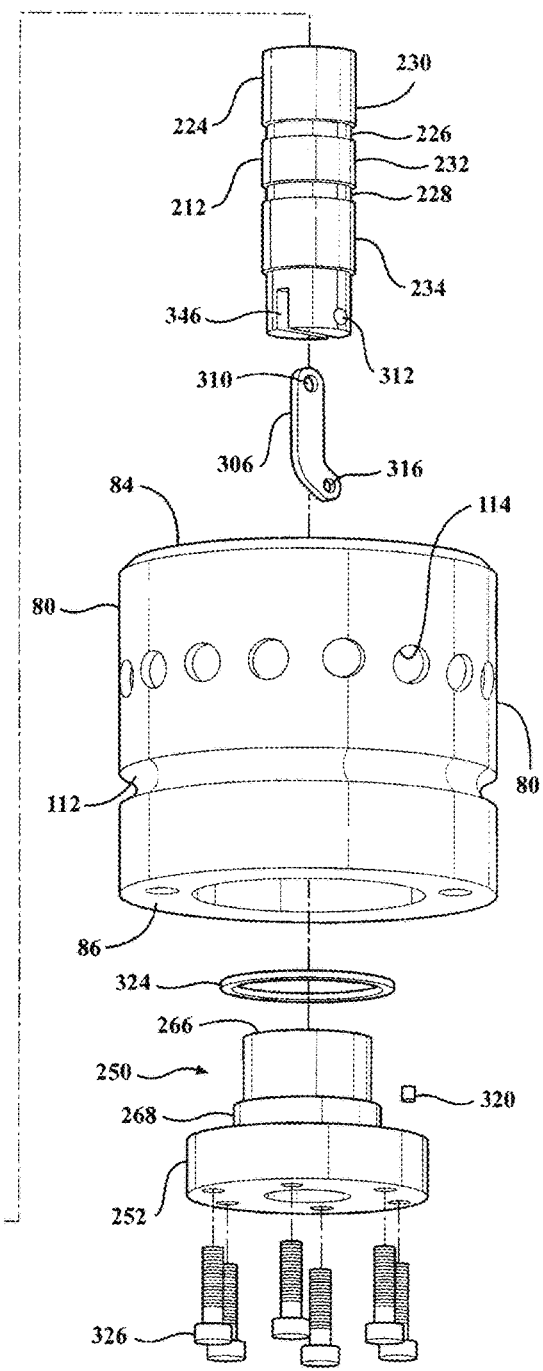
FIG. 19

ANHYDROUS AMMONIA FERTILIZER DISTRIBUTION LINE MONITOR

TECHNICAL FIELD

The invention is a system for monitoring an anhydrous ammonia fertilizer applicator apparatus that includes a temperature sensor in each distribution line between a manifold and the associated injector knife, a monitoring console that receives temperature data from each distribution line, displays the temperature sensor data for the system operator to observe and provides an operator alert concerning a deviation in the temperature measured by one sensor relative to other sensors which exceeds an operator set deviation from the average of the temperatures in a number of the distribution lines at substantially the same time.

BACKGROUND OF THE INVENTION

Growing plants need nitrogen. Plants such as maize (Indian corn) require a substantial quantity of nitrogen. The soil corn plants grow in obtains nitrogen from legumes such as soybeans, from snow and from other sources. Excess nitrogen will reduce yield of crops such as corn. Insufficient nitrogen will also reduce crop yield. Water used to irrigate plants generally contains minimal nitrogen.

Anhydrous ammonia has been used for many years to provide nitrogen. The anhydrous ammonia is injected into the ground as a liquid or vapor. Injection of anhydrous ammonia into soil is subject to a number of problems. Determining the quantity of nitrogen to be added is complicated by the fact that a substantial quantity of nitrogen may be stored in the soil. Soil samples are required to determine the status of stored nitrogen that is available. The soil samples often indicate that the distribution of stored nitrogen varies from one location to another in each farm field.

Anhydrous ammonia is one of the most efficient sources of nitrogen fertilizer for plant growth. Under atmospheric temperature and pressure anhydrous ammonia is a colorless gas. The gas is compressed into a liquid state for agricultural use. The liquid state can be maintained by pressure, by cooling or a combination of pressure and cooling. The equilibrium vapor pressure at sixty degrees Fahrenheit in a pressure tank is ninety three pounds per square inch (psi).

The cost of anhydrous ammonia has increased overtime due in part to the increased use by farmers around the planet. Farmers have in the past applied anhydrous ammonia and other fertilizers to maximize crop yield. Farmers are forced today to consider the costs and reduce the use of anhydrous ammonia and other fertilizers, when the cost of additional fertilizers exceeds the value of a minimal increase in crop production.

The loss of anhydrous ammonia needs to be limited to the extent possible. The over application in some areas of each field may also need to be limited or even eliminated.

The change in some anhydrous ammonia from a liquid to a vapor makes accurate control of the application rate difficult. Vapor separated from the liquid results in the over application rate in some areas. The separation of vapor may also result in the loss of some anhydrous ammonia.

Increased pressure in an anhydrous ammonia application system can keep the pressure of the liquid above the vapor pressure of the liquid at ambient temperatures. However, a pump in the supply system between a nurse tank and liquid discharge nozzle will create a pressure drop on the pump inlet side. This pressure drop will at times produce vapor. The anhydrous ammonia vapor will prevent accurate metering of a liquid and vapor mixture. Separation of the vapor generally results in a loss of some anhydrous ammonia.

Reducing the temperature in an anhydrous ammonia application system can keep the temperature of the liquid below the temperature at which vapor could be formed. Temperature lowering is obtained by bleeding off some liquid, expanding the liquid into a cold vapor and passing the cold vapor through a heat exchanger. Anhydrous ammonia liquid passing through the heat exchanger is cooled. The vapor discharged from the heat exchanger is then injected into the ground. The vapor is not completely lost. However, some anhydrous ammonia vapor is added to one of several plant rows that also receives a metered quantity of liquid anhydrous ammonia. The additional anhydrous ammonia from vapor may provide excess nitrogen to one crop row and may change crop yield in that crop row.

Anhydrous ammonia application systems with or without pumps as well as systems with or without cooling systems often include a flow sensor that measures the total flow rate. These systems include a servo valve that controls the total flow rate. A manifold divides the flow of anhydrous ammonia to soil cutting knives. The servo valve reduces the pressure of discharged anhydrous ammonia and may create some vapor. Vapor mixed with liquid anhydrous ammonia will result in an unequal flow from a manifold distributor downstream from a servo valve or other flow control device.

A number of additional distribution problems may occur. Some of these problems are obvious to an operator without a sensor warning. A broken line between a supply tank and the distributor will generally create a visible cloud. A disconnect of an anhydrous ammonia tank would be obvious. The location of the disconnected trailer and tank would indicate where fertilizer application stopped. A plugged distribution line is however difficult to detect without a suitable monitor system.

The liquid passes through various pipes and devices from the pressure tank to a manifold or distributor. The distributor divides the anhydrous ammonia liquid flow into a plurality of lines each of which is connected to a knife that opens a furrow in the ground. The furrow receives the anhydrous ammonia liquid and vapor and retains the nitrogen. The distributor divides liquid anhydrous ammonia into substantially equal flow through each line. However, if there is significant vapor mixed with the liquid, the distributor will not discharge equal quantities of fertilizer into each line.

The devices between the pressure tank and the distributor varies from one fertilizer distributor system to another. The devices include off-on valves, flow measurement devices, metering valves, vapor separators, coolers, pumps, orifices, filters and other devices. Each of these devices may create a pressure drop. The pressure drops may create anhydrous ammonia vapors.

Anhydrous ammonia applicators, with a large number of distribution lines and knives that open furrows, require flow splitters. The flow splitters divide the flow of liquid fertilizer into two or more equal fluid streams each of which is connected to a distributor. Distributors may be referred to as manifolds. Distributors have a limited number of discharge line ports. The number of distributors employed depend on the number of discharge ports in each distributor and the total number of furrow opening knives on the tool bar of the applicator. The flow splitters also produce pressure drops.

The lines from a distributor to the knives are relatively long and extend along a tool bar or applicator frame. Tool bars and applicator frames often have wings that pivot up and down to follow the surface of a field. Each of the knives may be mounted on a shank that moves relative to the frame. The lines from the distributor to the knives or other furrow openers are subjected to the movements of the knives relative to the distributor. The discharge end of each line is also subjected to soil moved by the knives, crop material on the ground, and possible freezing or plugging. The movements of the lines may decrease the size of the inside passage, wear a hole in a line or even sever a line.

The number of lines extending from each distributor to each of the knives and the small quantity of anhydrous ammonia passing through each line renders visual line monitoring difficult for an operator of an applicator. An applicator may have more than twenty four lines extending from two or more distributors. All of the lines extending from one distributor have a uniform length that is the same length as the length of the line to a knife that is the greatest distance from the distributor. The length of lines extending from one distributor are the same so that the pressure of anhydrous ammonia in the distributor forces the same quantity of fertilizer into each line. Lines with equal diameter and length have nearly the same resistance to flow, if the knives and lines are substantially identical to each other.

All of the liquid and vapor exiting a manifold through a distribution line will flow to a knife unless there is a failure in the distribution line and knife assembly. The distribution lines are generally available for a visual inspection. Operators inspect the distribution lines from time to time.

SUMMARY OF THE INVENTION

One or more anhydrous ammonia distribution manifolds are employed on each anhydrous ammonia fertilizer distributor. A distribution line is attached to a manifold discharge port and to an injector knife. The number of injector knives employed on each fertilizer applicator has increased. Multiple factors have caused the increase in the number of fertilizer distributor knives employed on each applicator. Primary factors include a reduction of soil compaction, a decrease in the availability of competent operators and the economic factors that require each acre of land to produce more food at a lower cost.

Distribution lines attached to each of the manifold discharge ports have equal lengths to provide substantially equal flow through the manifold ports. Due to the variations in the distance from a manifold port to an injector knife a first distribution line extends from a manifold discharge port to the injector knife that is located the longest distance from the manifold.

The first distribution line has sufficient length to accommodate movement of the injector knife relative to the manifold. The movement between the injector knife and the manifold is due to several features each of which is employed on some tool bars. These features include a spring steel shank that holds an injector knife, a knife holder attached a tool bar by links that permit the knife holder to move up and down to follow the ground surface, and a tool bar wing that is pivotally attached to a tool bar center section.

The distribution lines attached to injector knives that are closer to a manifold than the first distribution line have excess line that is supported by the tool bar. These distribution lines are subjected to movements between the injector knives each distribution line is attached to, and the tool bar. All of the distribution lines are also subjected to rocks and other objects thrown up by the injector knives. The injector lines can be scraped, crimped, pulled apart or cut.

Damage to one of the injector lines has been difficult to detect in an anhydrous ammonia system with a number of injector lines connected to one manifold. The quantity of fertilizer passing through each distributor line is a fraction of the fertilizer entering the manifold. Pressure sensors employed to monitor the flow of anhydrous ammonia from a storage vessel to the manifold are too slow. Most pressure sensors have a hysteresis characteristic that does not provide accurate pressure change data at times.

The measurement of the temperature of liquid anhydrous ammonia flowing in each line from a distributor needs to be accurate, fast and should not produce a pressure drop. Temperature sensors that extend into the flow path of a liquid disturb the flow, can in some circumstances create some vapor and provide a lower temperature due to the heat required to change ammonia from a liquid to a gas. A temperature sensor that is in direct contact with the distributor housing or two close to the distributor housing may measure the housing temperature or be modified by the housing temperature. The housing temperature does not change significantly when there is a problem in one line.

The anhydrous ammonia that pass from a distributor and into a line connected to a knife will be discharged into a furrow if the line and knife are in proper working condition. The anhydrous ammonia will be discharged if it is a mixture of vapor and liquid. The pressure, at the discharge end of the line, will be atmospheric pressure. It is therefore expected that some liquid will change to a gas by the time it is discharged at the knife. A temperature sensor in a line near the knife would indicate that freezing near the knife is likely and would subject sensor leads to failures.

Under some temperature and humidity conditions, distribution knives and connected discharge ports may freeze. Thawing and unplugging a frozen knife and distribution line may be difficult. The operator is unlikely to discover the problem for sometime without a monitor. Such an occurrence would most likely result in reduced crop yield for the growing season.

Temperature monitors provide accurate data several times per minute. The temperature sensors are mounted in a member such as aluminum that transfers heat rapidly. The sensor assembly is mounted in a flexible plastic tube that insulates the temperature sensor assembly from the heat of the manifold. The entire anhydrous ammonia fertilizer system is subjected to the same ambient temperature changes. The temperatures displayed for an operator of the fertilizer applicator are current temperatures within seconds and accurate within a fraction of a degree.

Temperature is measured in anhydrous ammonia fertilizer distribution line monitors in combination with currently used fertilizer applicators. These applicators include systems without pumps and systems with pumps. The manifolds may be made of various materials and have various shapes. The manifold may receive fertilizer from a separate flow rate controller. A combination flow rate and flow divider may also supply fertilizer to the distribution lines.

A fixed distribution cage has a cage cylindrical inside surface, a cage cylindrical outside surface, an anchor end and a free end. A plurality of axially elongated cage slots pass radially through the fixed distribution cage. The fixed distribution cage is press fit in the medium diameter bore. The anchor end of the fixed distribution cage engages the small ring shaped surface. Each of the plurality of axially elongated cage slots is aligned with one of the plurality of discharge ports. A seal is formed between the cylindrical outside surface of the fixed distribution cage and the medium diameter bore.

A piston head includes a cylindrical wall with a radially outer surface and a radially inner surface. A transverse plate is integral with the cylindrical wall and divides the cylindrical wall into a head end skirt with a head end and a rod end skirt with a skirt rod end concentric with a piston head axis. A plurality of axially elongated piston slots are parallel with the piston head axis. Each of the plurality of axially elongated piston slots pass radially through the head end skirt between the transverse plate and the head end of the head end skirt. At least one bore through the transverse plate provides equal fluid pressure on the piston head.

A piston shaft has a piston end. The piston end is connected to the transverse plate in the rod end skirt. The piston shaft also has a driven end. A cylindrical bearing surface of the piston shaft is between the piston end and the driven end. A first sealing ring groove in the cylindrical bearing surface and a second sealing ring groove in the cylindrical bearing surface divide the cylindrical bearing surface into a piston end bearing portion surface, a center portion bearing surface and a control end bearing portion surface. A head end resilient low friction seal is mounted in the first sealing ring groove. A control end resilient low friction seal is mounted in the second sealing ring groove. A connector rod is pivotally connected to the driven end.

A control end insert has a base end received in the large diameter bore and clamped to the large ring shaped surface. A mast first cylindrical portion, of the control end insert, is received in the small diameter bore of the body. A mast second cylindrical portion has an outside diameter that is smaller than the small diameter bore and the radially inner surface of the cylindrical wall of the piston head. A mast ring shaped surface is between the mast first cylindrical portion and the mast second cylindrical portion. A mast end surface faces away from the base end. A mast central bore passes through the control end insert and is coaxial with the central axis of the body.

The piston shaft extends from the transverse plate of the piston head passes through the central bore of the central end insert. The piston shaft holds the head end resilient low friction seal and the control end resilient low friction seal in the mast central bore and in sliding engagement with the mast central bore. The piston shaft holds the radially outer surface of the piston head in sliding and sealing engagement with the cage cylindrical inside surface of the fixed distribution cage.

An inlet end cover is clamped to the inlet end of the cylindrical body. An inlet threaded bore in the inlet end cover is connected to the continuing supply line.

An electric actuator is connected to the connector rod through a connecting rod drive assembly. The actuator moves the piston head relative to the fixed distribution cage to a position in which anhydrous ammonia flow through the plurality of axially elongated piston slots is blocked, to a position in which maximum anhydrous ammonia flow through the plurality of axially elongated piston slots and the plurality of axially elongated cage slots occurs. The actuator also moves the piston head relative to the fixed distribution cage to a position which provides a desired flow rate.

Each of the plurality of axially elongated piston slots meters anhydrous ammonia fertilizer into the portion of an adjacent one of the plurality of axially elongated cage slots that is in communication with the axially elongated piston slot.

The plurality of axially elongated piston slots has a piston slot length from a slot head end to a slot rod end that is substantially the same as the cage slot length from a first inside arcuate end to a second inside arcuate end. Each axially elongated piston slot has a piston slot width transverse to a piston head axis from an elongated first wall to an elongated second wall that is less than a cage slot width transverse to a cage axis from a first straight inside edge to a second inside straight edge. Each of the axially elongated cage slots in the fixed distribution cage increases in size from the cage cylindrical inside surface to the cage cylindrical outside surface. The transverse plate of the piston head includes a recess that receives a piston engaging surface of the piston shaft.

The monitor and controller will work well with a variable orifice distribution assembly in which the control of the application rate of anhydrous ammonia fertilizer and the division of flow into a plurality of flow paths to each of a plurality of knives occurs in one distribution assembly. The monitor and controller will also work well with in an application system that has a flow rate controller which is adjustable to obtain a desired flow rate of anhydrous ammonia and supplies the anhydrous ammonia through a line to a separate manifold that divides the flow into a plurality of distribution lines. Each of the distribution lines supplies the fertilizer to one ground engaging knife.

The cost of anhydrous ammonia fertilizer and the desire to control the quantity of fertilizer applied is mentioned above. However, the cost of fertilizer is minor compared to the decreased yield of grain in one row of plants that can occur in a short period of time when a distribution line is damaged or severed.

BRIEF DESCRIPTION OF DRAWINGS

The presently preferred embodiment of the invention is disclosed in the following description and in the following drawings, wherein:

FIG. 2 is a side elevational view of the variable orifice distribution assembly;

FIG. 3 is a front elevational view of the variable orifice distribution assembly;

FIG. 4 is a bottom view of the variable orifice distribution assembly;

FIG. 9 is a side elevational view of a piston head of the variable orifice distribution assembly;

FIG. 10 is a sectional view of the piston head taken along line 9-9 in FIG. 9;

FIG. 11 is an enlarged elevational view of a piston shaft with a partial vertical section;

FIG. 19 is an expanded view of the variable orifice distribution assembly;

DETAILED DESCRIPTION OF THE PREFERRED EMBODIMENTS

Figure 20:
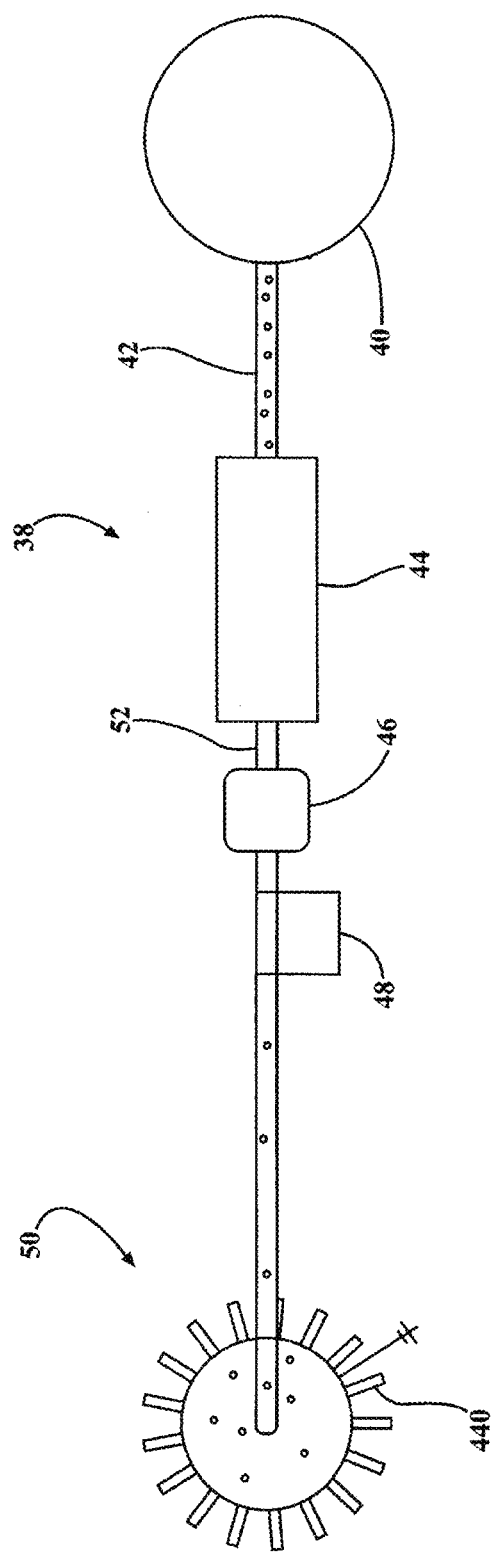
FIG. 20 is a schematic of the anhydrous ammonia fertilizer applicator system including the variable orifice distribution assembly.

The anhydrous ammonia fertilizer distribution system 38 shown schematically in FIG. 20 includes a pressurized supply vessel 40, a heat exchanger 44, flow meter 46, an on and off valve 48 and a variable orifice distributor assembly 50. A supply line 42 carries anhydrous ammonia from the supply vessel 40 to the heat exchanger 44. A continuing supply line 52 carries anhydrous ammonia from the heat exchanger to the variable orifice distributor 50 through the flow meter 46 and the on and off valve 48. The supply vessel 40 is pressurized by the vapor pressure of the anhydrous ammonia at the temperature of the liquid in the vessel. The vapor pressure in the supply vessel is generally between fifty pounds per square inch and one hundred and fifty pounds per square inch depending upon the temperature. At eighty degrees Fahrenheit the vapor pressure is one hundred and thirty-eight pounds per square inch. The heat exchanger 44 cools the anhydrous ammonia to a temperature at which the vapor pressure of the anhydrous ammonia entering the variable orifice distributor assembly 50 is below the actual pressure and the liquid anhydrous ammonia is unlikely to change from a liquid to a vapor. The flow meter 46 creates no pressure drop or a very small pressure drop so that vapor is not created. The on and off valve 48 is a ball valve with a liquid passage cross section area that is substantially the same as the liquid passage cross section area of the supply line 42 and the continuing supply line 52. A pressure drop is minimized and turbulence is minimized to reduce the pressure drop. Friction between the flowing liquid and the passage walls of the passages of the supply line 42 and the continuing supply line 52, between the supply vessel 40 and variable orifice distributor apparatus 50 are minimized. However, friction and some pressure drop will occur and increase fluid temperature. The heat exchanger 44 will reduce the creation of anhydrous ammonia vapor and may condense some vapor in the supply line 42, to a liquid.

The anhydrous ammonia entering the variable orifice distributor assembly 50 should contain very little vapor. The pressure drop between the supply vessel 40 and the variable orifice distributor 50 is minimized to reduce the production of liquid vapors. Elimination of a pump and a metering valve between the supply vessel 40 and the variable orifice distribution assembly 50 eliminates two significant vapor producers.

The variable orifice distributor assembly 50 meters anhydrous ammonia and distributes the anhydrous ammonia through a plurality of discharge lines 440. The variable orifice distributor 50 has a cylindrical body 80 with a central axis 82. The body 80 has an inlet end 84, a control end 86 and a cylindrical outer surface 88. The inlet end 84 and the control end 86 are perpendicular to the central axis 82. A central bore 90 through the cylindrical body 80 includes a small diameter bore 92 that is concentric with outer surface 88 and the central axis 82. A large diameter bore 94 is concentric with central axis 82 and extends axially from the control end 86 to the small diameter bore 92. A medium diameter bore 96 is concentric with the central axis 82 and extends axially from the inlet end 84 to the small diameter bore 92. A large ring shaped surface 98, between the small diameter bore 92 and the large diameter bore 94, is perpendicular to the central axis 82 and faces toward the control end 86. A small ring shaped surface 100, between the medium diameter bore 96 and the small diameter bore 92, is perpendicular to the central axis 82 and faces toward the inlet end 84.

A plurality of threaded bores 102, in the body 80, pass through the large ring shaped surface 98. Each threaded bore 102 extends parallel to the central axis 82. A dowel pin bore 104 passes through the large ring shaped surface 98. A plurality of threaded bores 106 extend into the inlet end 84 of the cylindrical body 80 between the cylindrical outer surface 88 and the medium diameter bore 96. Each of the threaded bores 106 extends parallel to the central axis 82.

A gasket recess 108 is provided in the cylindrical body 80 between the small diameter bore 92 and the large ring shaped surface 98. An inlet end gasket recess 110 is provided in the body 80 between the inlet end 84 and the medium diameter bore 96. A mounting groove 112 is provided in cylindrical outer surface 88 of the body 80. The mounting groove 112 extends continuously around the body 80.

Figure 5:
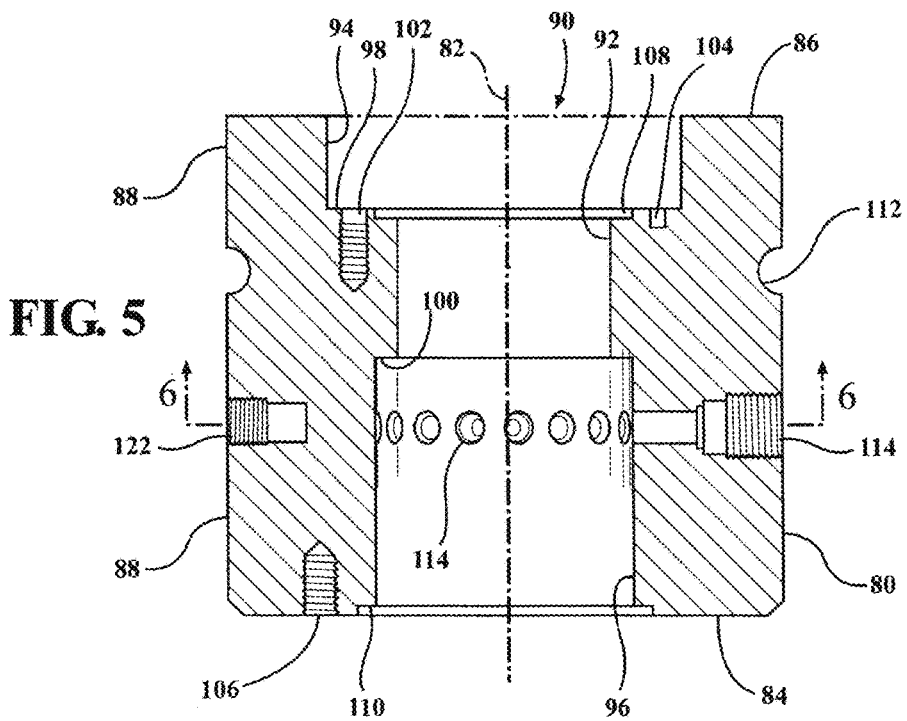
FIG. 5 is a vertical sectional view of a cylindrical body of the variable orifice distribution assembly.
Figure 6:
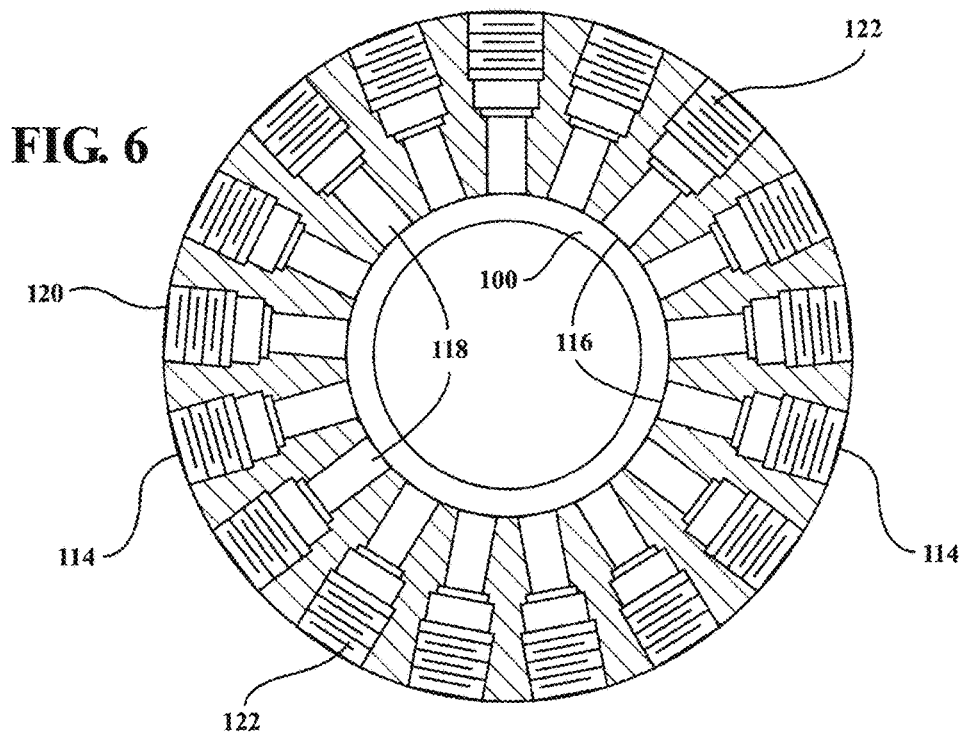
FIG. 6 is a horizontal sectional view of the cylindrical body taken along line 5-5 in FIG. 5.

A plurality of discharge ports 114 extend radially outward from the medium diameter bore 96. Each outlet port 114 has a radially inner portion 116 that is a cylindrical bore 118. The radially outer portion 120 of each outlet port 114 is a threaded bore portion 122. The threaded bore portion 122 has a diameter that is larger than the diameter of the cylindrical bore 118. The cylindrical body 80, as shown in FIG. 5, has seventeen discharge ports 114. The number of discharge ports 114 can be changed. Seventeen ports can fertilize sixteen crop rows. Discharge ports 114 that are not required can be plugged. If more than seventeen discharge ports 114 are required for a large fertilizer applicator, additional variable orifice distributors 50 may be added. Row crop planters that plant eight, sixteen or twenty-four rows per pass through a field are employed by farmers. A few large farmers employ planters that plant thirty-six rows on each pass through a field. It is possible to make two or more passes through a field to apply anhydrous ammonia to an area planted during one pass by a planter and still have the desired spacing between plant rows and the fertilizer.

Figure 7:
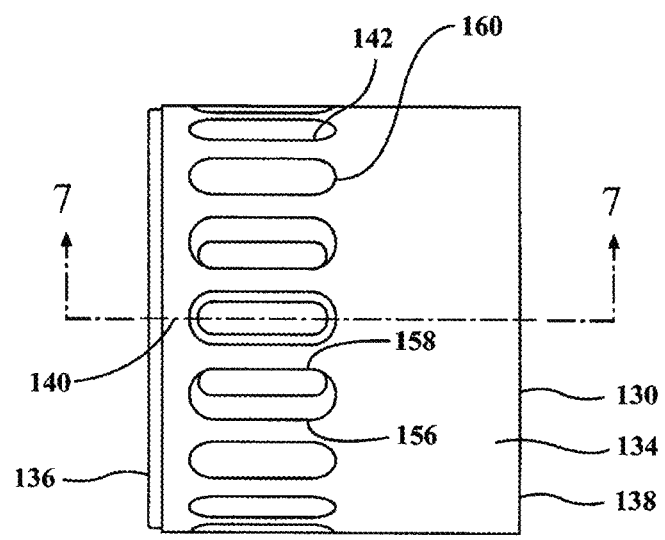
FIG. 7 is an enlarged side view of a fixed distribution cage of the variable orifice distribution assembly.
Figure 8:
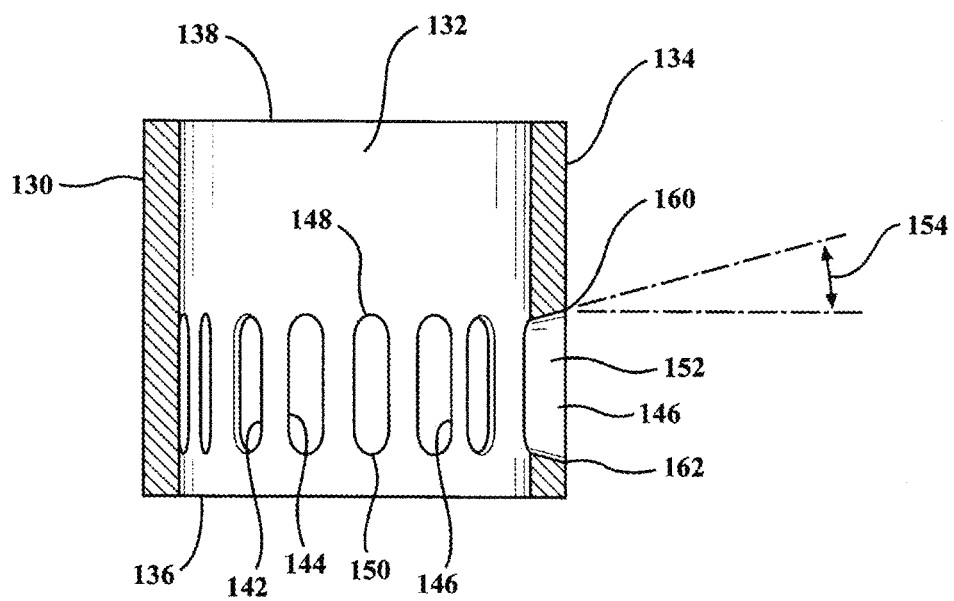
FIG. 8 is a vertical sectional view of the fixed distribution cage taken along line 7-7 in FIG. 7.

A fixed distribution cage 130 is shown in FIGS. 7 and 8. The distribution cage 130 is a tubular member with a cylindrical inside surface 132 and a cylindrical outer surface 134. The cylindrical outer surface 134 has a fixed cage diameter that is slightly larger than the diameter of the medium diameter bore 96 of the cylindrical body 80. The fixed distribution cage 130 includes an anchor end 136 and a free end 138. The fixed distribution cage 130 is pressed into the medium diameter bore 96. An axis 140 of the fixed distribution cage 130 is perpendicular to the anchor end 136 and the free end 138. The axis 140 is also coaxial with the cylindrical inside surface 132 and the cylindrical outer surface 134.

Seventeen axially elongated slots 142 pass through the fixed distribution slot from the cylindrical inside surface 132 to the cylindrical outer surface 134. Each axially elongated slot 142 has a straight first inside edge 144 and a straight second inside edge 146. The straight first inside edge 144 and the straight second inside edge 146 are parallel to the axis 140 of the fixed distribution cage 130. Each elongated slot 142 has an inside arcuate end 148 positioned toward the free end 138 of the fixed distribution cage 130. Each elongated slot 142 also has an inside arcuate end 150 positioned toward the anchor end 136 of the fixed distribution cage 130.

Walls 152 of each axially elongated slot 142 extend radially outward from the inside edges at an angle 154 of fifteen degrees thereby increasing the area of each of the elongated slot from the cylindrical inside surface 132 to the cylindrical outside surface 134. Each axially elongated slot 142 has a straight first outside edge 156 and a straight second outside edge 158. The straight first outside edge 156 and the straight second outside edge 158 are parallel to the axis 140 of the fixed distribution cage 130. Each elongate slot 142 has an outside arcuate end 160 positioned toward the free end 138 of the fixed distribution cage 130. Each elongated slot 142 also has an outside arcuate end 162 positioned toward the anchor end 136 of the fixed distribution cage 130.

The inside arcuate end 148 is spaced from inside arcuate end 150 a distance, parallel to the axis 140, that is one third of the minimum distance from the anchor end 136 to the free end 138 of the fixed distribution cage 130. The outside arcuate end 160 of each axially elongated slot 142 is midway between the anchor end 136 and the free end 138 of the fixed distribution cage 130. There is no fluid passage through the cylindrical inside and outside surfaces 132 and 134 of the fixed distribution cage 130 between the axially elongated slots 142 and the free end 138 of the fixed distribution cage. All anhydrous ammonia that passes through the axially elongated slots 142 is directed out of the cylindrical body 80 through the discharge ports 114. The cylindrical outside surface 134 of the fixed distribution cage 130 cooperates with the walls of the medium diameter bore 96 to prevent leakage between discharge ports 114, when each axially elongated slot 142 is in radial alignment with one of the discharge ports 114.

A piston head 170 has a cylindrical wall 172. The cylindrical wall 172 has a radially outer surface 174 with an outside piston diameter. The outside piston diameter is substantially the same as the diameter of the cylindrical inside surface 132 of the fixed distribution cage 130. A transverse plate 176 is integral with the cylindrical wall 172. An upper skirt 178 extends from the transverse plate 176 to a skirt head end 180. A rod end skirt 182 extends from the transverse plate 176 to a skirt rod end 184. a piston head axis 186, of the piston head 170, is coaxial with the radial outer surface 174. The fixed distribution cage 130 is pressed into the medium diameter bore 96 until the anchor end 136 seats on the small ring shaped surface 100. There is a slight interference fit to insure that the fixed distribution cage 130 does not move relative to the cylindrical body 80 after being clamped in place as explained below.

The upper skirt 178 has seventeen slots 188. Each slot 188 has an elongated first wall 190 and an elongated second wall 192 that are parallel with the piston head axis 186. Each slot 188 has a head end wall 194 that is perpendicular to the piston head axis 186 and spaced from the skirt head end 180. A rod end 196 of each slot 188 is transverse to the piston head axis 186 and in a plane that includes the head end surface 198 of the transverse plate 176. The length of the slots 188 parallel to the piston head axis 186 is substantially the same length as the length of the axially elongated slots 142 through the fixed distribution cage 130. The elongated first wall 190 and the elongated second wall 192 of each slot 188 in piston head 170 are closer together than the first straight inside edge 144 and the second inside edge 146 of axially elongated slot 142. During flow of anhydrous ammonia through the variable orifice distribution assembly 50, a slot 188 is the primary flow restrictor. Liquid and vapor that passes through one slot 188 is restricted to move through the aligned slot 142 and through a line 440 to a knife 388 in communication with the one slot. The rod end skirt portion 182 has no passages through the cylindrical wall 172 between the transverse plate 176 and the skirt rod end 184. The rod end skirt portion 182 has a cylindrical rod end inside surface 208 that is coaxial with the piston head axis 186. A beveled surface 200 extends from the cylindrical rod end inside surface 208 to the skirt rod end 184 and continuously about the piston head axis 186. A cap screw bore 202 passes through the center of the transverse plate 176. Two small diameter bores 204 pass through the transverse plate 176 to equalize pressure on the cylindrical rod end inside surface 208 and the rod side 206 of the transverse plate, with pressure on the head end surface 198 of the transverse plate. A closed end dowel pin bore 210 extends into the transverse plate 176 from the rod side 206.

Figure 17:
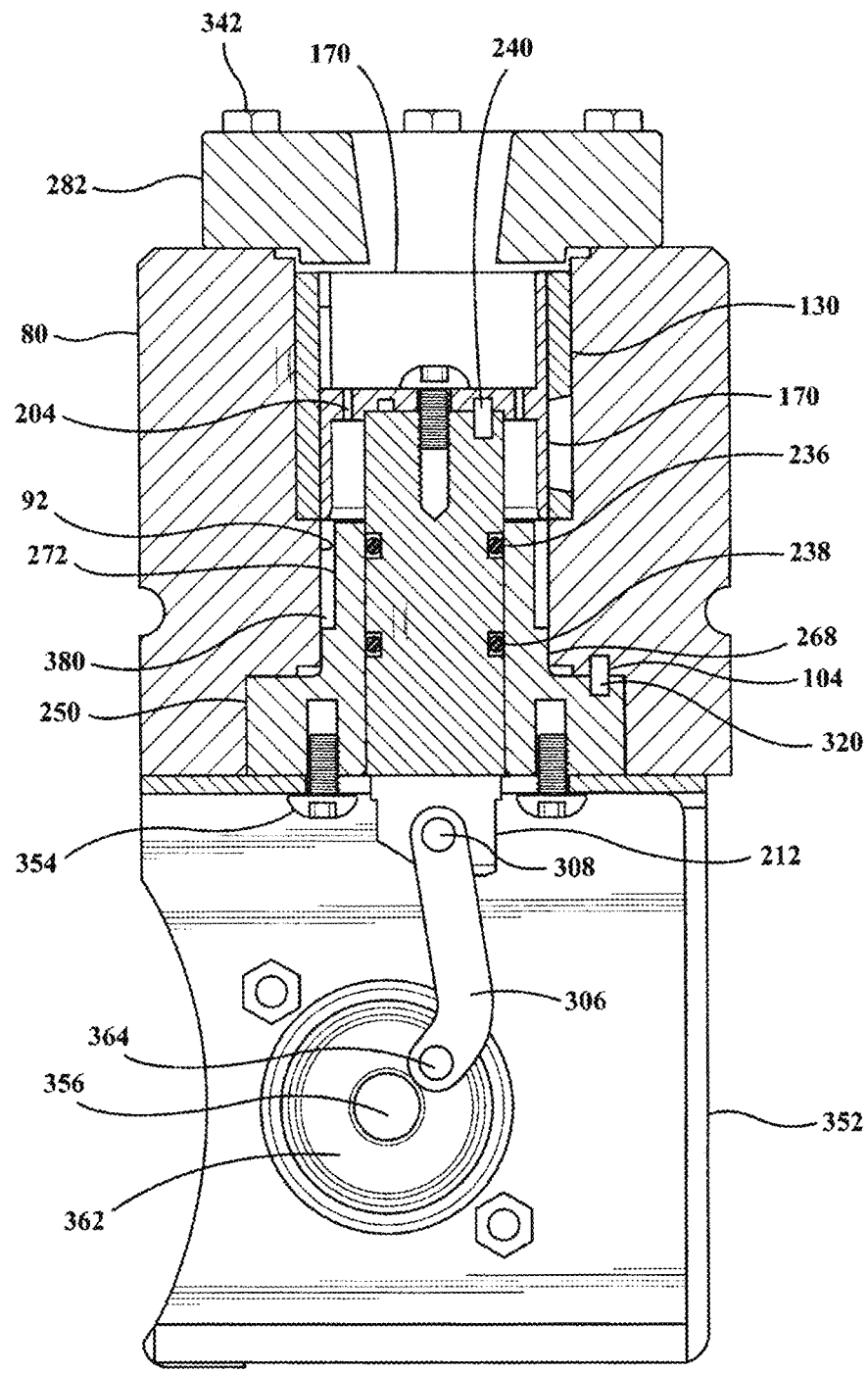
FIG. 17 is a vertical sectional view through the variable orifice distribution assembly and a portion of the connector rod drive assembly.

A piston shaft 212, shown in FIG. 11, is a cylindrical rod with a piston end 214 and a driven end 216. The piston end 214 includes a piston engaging surface 218, a threaded bore 220 and a dowel pin bore 222. The piston end 214 with the piston engaging surface 218 is received in a recess 207 in the transverse plate 176. The cylindrical wall 209 of the recess 207 engage the piston shaft 212 to center the piston head 170 on the piston shaft. The threaded bore 220 is coaxial with the piston shaft 212 and perpendicular to the piston engaging surface 218. The dowel pin bore 222 is radially spaced from the threaded bore 220 and perpendicular to the piston engaging surface 218. A cylindrical bearing surface 224, on this piston shaft 212, extends from the piston engaging surface 218 toward the driven end 216. Two sealing ring grooves 226 and 228 divide the bearing surface 224 into a piston end bearing portion cylindrical surface 230, a center portion bearing cylindrical surface 232 and a remote end bearing portion cylindrical surface 234. Resilient low friction seals 236 and 238, shown in FIG. 17, are mounted in the sealing ring grooves 226 and 228. A dowel pin 240 is mounted in the dowel pin bore 222 in the piston shaft 212 and dowel pin bore 210 in the transverse plate 176 of the piston head 170. A cap screw 242 passes through a lock washer 244, the cap screw bore 202 through the piston head 170 and screws into the threaded bore 220. The cap screw 242 is tightened to secure the piston head 170 to the piston shaft 212 and retain the dowel pin 240 in the dowel pin bore 222 and the dowel pin bore 210.

A control end insert 250, of the variable orifice distributor assembly 50, includes a base 252, a mast 254, and a central bore 256. The central bore 256 has a control end insert axis 258. A base cylindrical outer surface 260 is coaxial with insert axis 258. The diameter of the base outer cylindrical surface 260 is substantially the same diameter as the large diameter bore 94 of the cylindrical body 80. The axially outer surface 262 of the base 252 is transverse to the insert axis 258. An axially inner surface 264 of the base 252 is transverse to the control end insert axis 258 and parallel to the axially outer surface 262. The mast 254 has a mast end surface 266 that is parallel to the axially outer surface 262. A first cylindrical portion 268 of the mast 254, extends axially from the inner surface 264 of the base 252 to a ring shaped surface 270 that is perpendicular to the control end insert axis 258. A second cylindrical portion 272, of the mast 254, extends from the ring shaped surface 270 of the first cylindrical portion 268 to mast end surface 266. The first cylindrical portion 268 has a larger diameter than the diameter of the second cylindrical portion 272. A plurality of space apart bores 276 pass through the base 252 from the axially outer surface 262 and through the axially inner surface 264. Each of the plurality of spaced apart bores 276 includes a counter bore 278 that extends through the outer surface 262 of the base 252. Two closed end threaded bores 280 are provided in the base 252 of the control end insert 250. Both threaded bores 280 pass through the axially outer surface 262 of the base 252.

Figure 15:
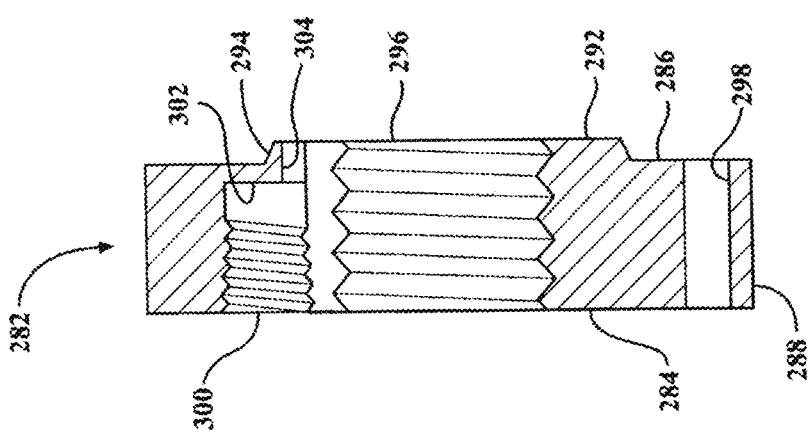
FIG. 15 is a sectional view of the inlet end cover, through an inlet end cover axis.
Figure 14:
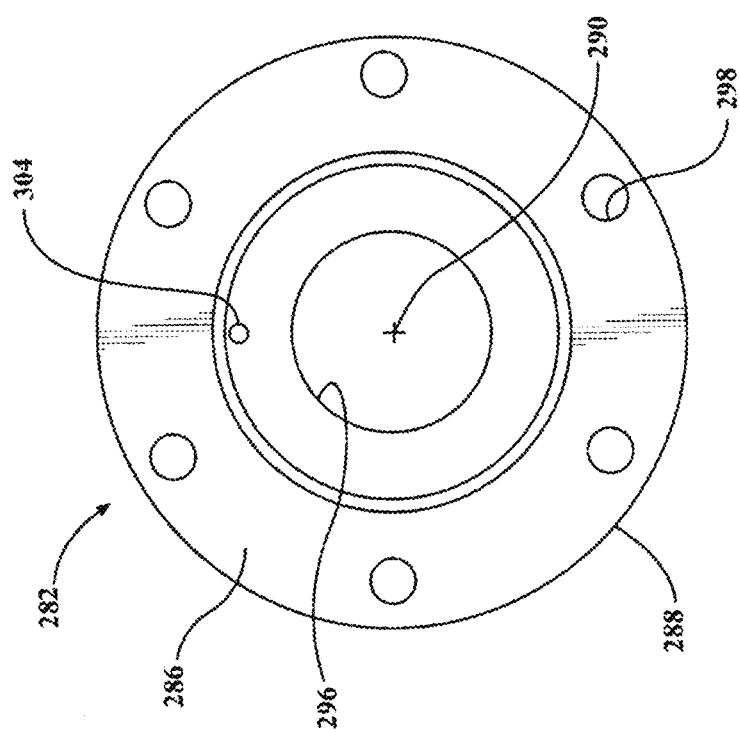
FIG. 14 is an inside view of an inlet end cover of the variable orifice distribution assembly.

An inlet end cover 282, of the variable orifice distribution assembly 50, is shown in FIGS. 14 and 15. The inlet end cover 282 has an outside cover surface 284 and an inside cover surface 286. The outside cover surface 284 is a flat surface that is perpendicular to an inlet end cover axis 290. The inside cover surface 286 is parallel to and spaced from the outside cover surface 284. An outer cylindrical surface 288 is concentric with the inlet cover axis 290. A central inside cover surface 292 is transverse to the inlet cover axis 290. The inside cover surface 286 is located axially between the outside cover surface 284 and the central inside cover surface 292. A truncated conical surface 294 extends from the inside cover surface 286 to the central inside cover surface 292. An inlet threaded bore 296 is coaxial with the inlet end cover axis 290. The inlet threaded bore 296 has tapered pipe threads that are commonly employed in liquid fertilizer conveyor systems. A different liquid inlet bore thread could be employed if desired. Six bolt bores 298 are provided through the inlet end cover 282. The bores 298 are spaced an equal distance from the inlet end cover axis 290 and pass through the outside cover surface 284 and the inside cover surface 286. A threaded bore 300 is provided in the inlet end cover 282. The threaded bore 300 is positioned to a side of the inlet threaded bore 296 and extends from the outside cover surface 284 to a bore bottom 302. A small bore 304 passes through the bore bottom 302 and the central inside cover surface 292. A pressure gauge (not shown) may be mounted in the threaded bore 300 if desired. The pressure gauge will indicate the pressure on anhydrous ammonia entering the variable orifice distribution assembly 10. The pressure will let the operator know if there is a blockage to flow upstream or if the supply tank is empty. The pressure will also permit an operator to determine if there is significant gas or vapor in the anhydrous ammonia fertilizer. A plug can close the threaded bore 300 if pressure measurements are not needed.

Figure 16:
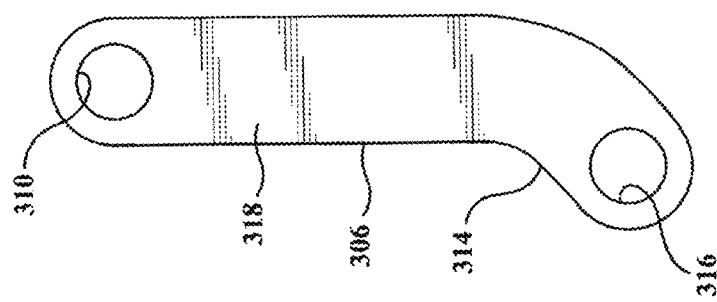
FIG. 16 is an enlarged elevational view of a connector rod of the variable orifice distribution assembly.
Figure 18:
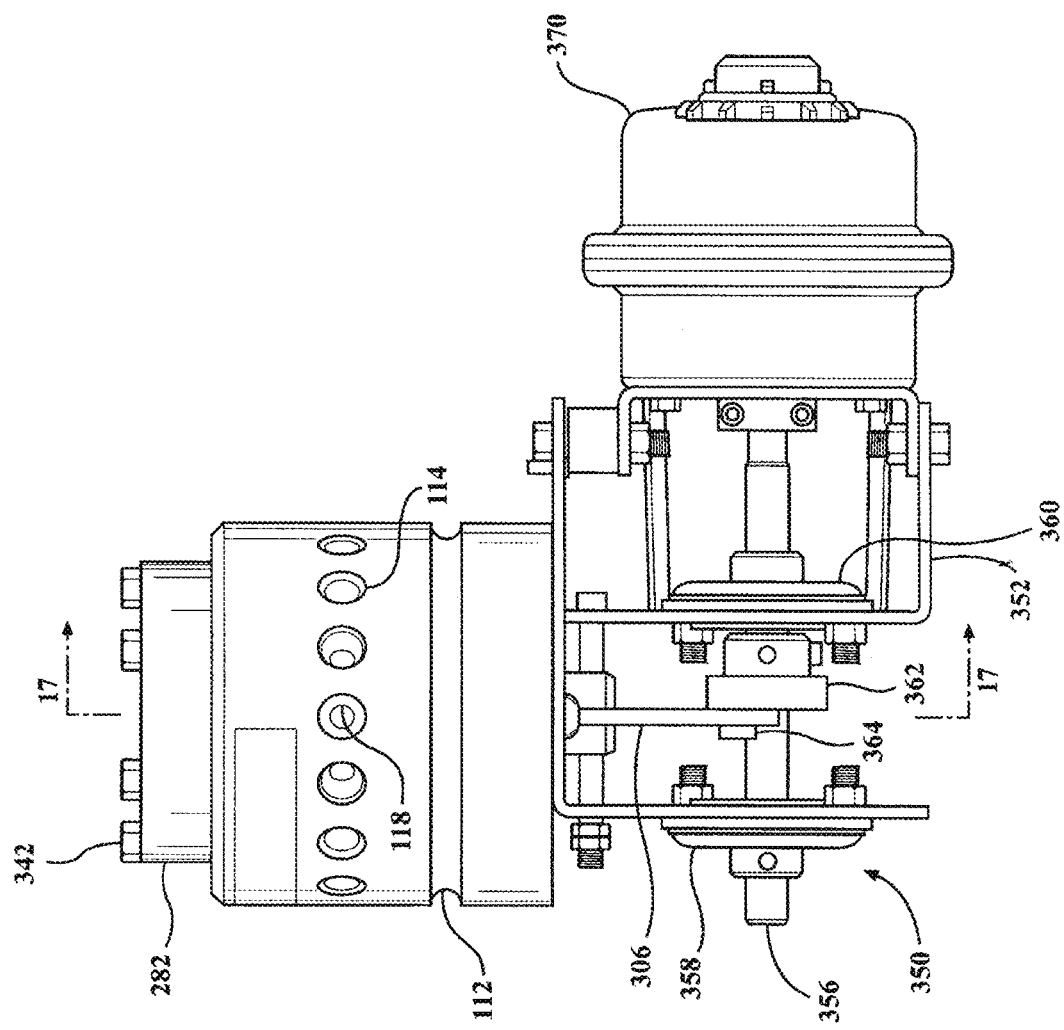
FIG. 18 is an elevational view of the variable orifice distribution assembly the attached connector rod drive assembly and a direct current actuator.

A connector rod 306, shown in FIGS. 16 and 18 is connected to the piston shaft 212 by a pivot pin 308. The pivot pin 308 passes through a bore 310 through the connecting rod 306 and a bore 312 through the piston shaft 212. An offset 314 in the connector rod 306 moves a second bore 316 to one side of a connector rod portion 318 with the bore 310.

The order of assembly of the variable orifice distribution assembly 50 can be varied somewhat from the order set forth below. However, the final position of most parts is fixed.

The fixed distribution cage 130 is pressed into the medium diameter bore 96 through the inlet end 84 of the cylindrical body 80. Each axially elongated slot 142 is centered on one of the cylindrical bores 118 of a discharge port 114. Alignment of one elongated slot 142 with an adjacent cylindrical bores 118 will align all of the elongated slots with an adjacent cylindrical bore. The fixed distribution cage 130 is pressed into the medium diameter bore 96 until the anchor end 136 of fixed distribution cage engages the small ring shaped surface 100. The press fit of the fixed distribution cage 130 in the cylindrical body 80 creates a seal between each axially elongated slot 142 and the adjacent cylindrical bore 118.

The control end insert 250 has a base 252 that is received in the large diameter bore 94 of the cylindrical body 80. The mast 254, of the control end insert 250, includes a first cylindrical portion 268 that is received in small diameter bore 92 of the cylindrical body 80. The engagement between first cylindrical portion 268 and the small diameter bore 92 holds the control end insert axis 258 coaxial with the central axis 82 of the cylindrical body 80. Engagement, if any, between the base cylindrical outer surface 260 and the large diameter bore 94 may also holds the control end insert axis 258 coaxial with the central axis 82 of the cylindrical body 80. Engagement of the large ring shaped surface 98, of the cylindrical body 80, and the axially inner surface 264 axially positions the control end insert 250 along the central axis 82 of the cylindrical body 80.

A dowel pin 320 received in a dowel pin bore 104 in the cylindrical body 80, and a dowel pin bore 322 fixes the position of the control end insert 250 about the central axis 82. A gasket 324 is received in gasket recess 108 in the cylindrical body 80. Bolts 326 pass through bores 276 through the base 252 and screw into threaded bores 102 in the body 80 to clamp the control end insert 250 to the large ring shaped surface 98. The gasket 324 prevents leakage of fertilizer between the cylindrical body 80 and the control end insert 250.

The piston head 170, and attached piston shaft 212 have a resilient first seal 236 mounted in sealing ring groove 226. A resilient second seal 238 is mounted in sealing ring groove 228. The driven end 216 of the piston shaft 212 is inserted into the central bore 256 from the mast end surface 266. The central bore 256, of the control end insert 250, cooperates with the piston end cylindrical portion bearing surface 230, the central cylindrical portion bearing surface 232, and the remote end cylindrical portion bearing surface 234 of the piston shaft 212 to hold the piston head axis 186 parallel to the control end insert axis 258. All three cylindrical portion bearing surfaces 230, 232 and 234 remain in at least partial engagement with the central bore 256 through the control end insert 250 during operation of the variable orifice distribution assembly 50.

An inlet end gasket 340 is positioned in the inlet end gasket recess 110 in the inlet end 84 of the cylindrical body 80. The truncated conical surface 294 on the inlet end cover 282 centers the cover relative to the medium diameter bore 96. The inlet end gasket 340, in the inlet end gasket recess 110, is engaged by the conical surface 294 and the inside cover surface 286 and seals between the inlet end 84 of the cylindrical body 80 and the inlet end cover 282. Bolts 342 pass through lock washers 344 and bolt bores 298 and screw into threaded bores 106 to clamp the inlet end cover 282 to the cylindrical body 80

The connector rod 306 is inserted into a groove 346 in the driven end 216 of the piston shaft 212. A pivot pin 308 passes through a pin bore 312 through the piston shaft 212 and the bore 310 in the connector rod 306.

Figure 12:
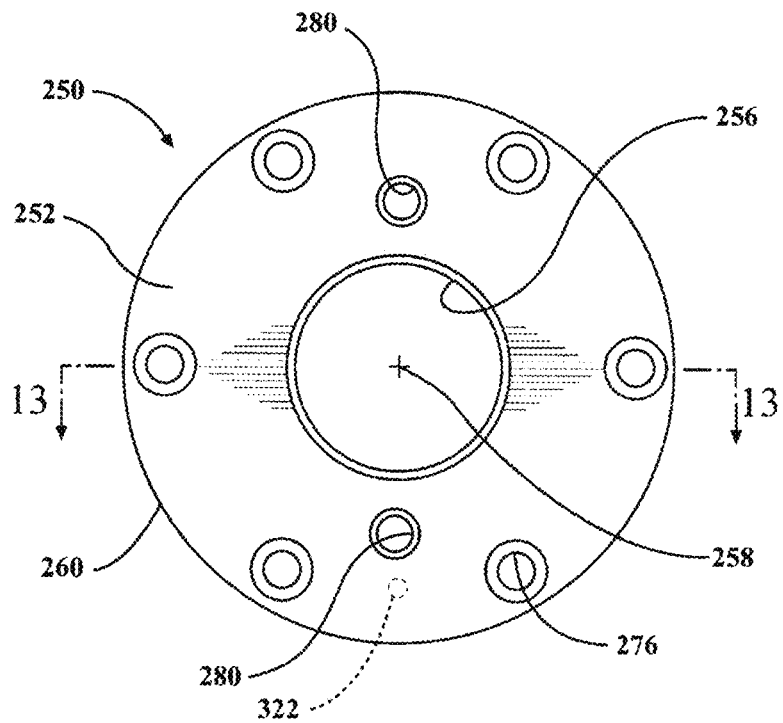
FIG. 12 is a bottom view of a control end insert of the variable orifice distribution assembly.
Figure 13:
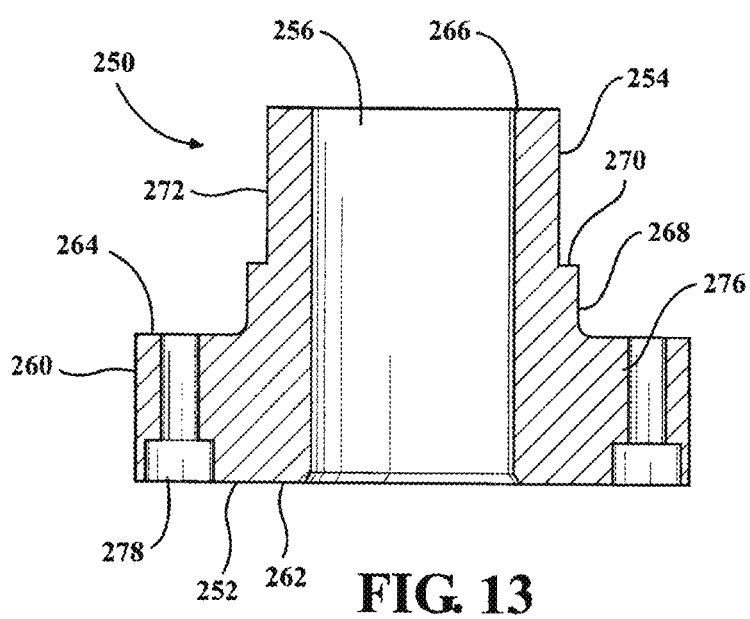
FIG. 13 is a sectional view of the control end insert taken along line 12-12 in FIG. 12.

A connector rod driver assembly 350 shown in FIG. 18, includes a housing 352 clamped to the control end insert 250 by bolts 354 that are received in closed end threaded bores 280 shown in FIG. 12. A crank shaft 356 is journaled in the housing 352 by bearings 358 and 360. A bell crank 362 is fixed to the crank shaft 356. A shoulder screw 364 passes through the second bore 316 in the connector rod 306 and screws into the bell crank 362. Pivotal movement of the crank shaft 356 moves the connector rod 306 and slides the piston shaft 212 in the central bore 256 of the control end insert 250. Movement of the piston shaft 212 results of movement of the piston head 170 in the fixed distribution cage 130 as described below. The connector rod 306 is held by the shoulder screw 364 for pivotal movement about a screw axis parallel to the shaft axis of crank shaft 356. The connector rod 306 prevents pivotal movement of the piston shaft 212 bout the control end insert axis 258 and the central axis 82 of the central bore 90.

A direct current (DC) actuator 370 is connected to the housing 352 and the crank shaft 356 to control the position of the piston head 170 relative to the fixed distribution cage 130.

Linear movement of the piston head 170 to a position close to the central inside cover surface 292 of the inlet end cover 282 moves the piston slots 188, of the piston head 170, and the head end skirt 178 to a position in which the flow of fluid fertilizer such as anhydrous ammonia through the slots 188 is blocked by the cylindrical inside surface 132 of the fixed distribution cage 130 between the free end 138 and the axially elongated slots 142. The cylindrical inside surface 132 of the fixed distribution cage 130 has an inside diameter that is substantially the same as the outside diameter of the head end skirt 178 of the piston head 170. The flow of fluid between the radial outer surface 174 of the piston head 170 and the cylindrical inside surface 132 of the fixed distribution cage 130 is blocked. However, the piston head 170 is permitted to move axially relative to the fixed distribution cage 130 with a minimal force applied by the connector rod 306.

The piston head 170 is shown in a closed position in FIG. 17. Retraction of the piston shaft 212 from the central bore 256 in the control end insert 250 moves the slots 188 in the piston head 170 axially and into alignment with the axially elongated slots 142 and provide the maximum area flow path through each discharge port 114. As the piston shaft 212 is retracted from the closed position adjacent to central inside cover surface 292 of the inlet end cover 282, the rod end skirt portion 182 of the piston head 170 moves into the open space 380 between the small diameter bore 92 in the cylindrical body 80 and the second cylindrical portion 272. A ring shaped surface 270 on the control end insert 250 closes the control end of the open space 380. As the rod end skirt portion 182 moves into a selected position in the open space 380, the second cylindrical portion 272 of the control end insert 250 is positioned inside the cylindrical rod end skirt portion 182. Upon the skirt rod end 184 reaching ring shaped surface 270, the open space 380 is nearly filled. The mast end surface 266 approaches the rod side 206 of the transverse plate 176. The second cylindrical portion 272, of the control end insert 250, substantially fills the space inside the rod end skirt portion 182. Fluid that is displaced as the piston head 170 moves to a position closest to the control end 86 of the cylindrical body 80, passes through the small diameter bores 204 and into the head end skirt 178. All of the anhydrous ammonia or other fluid between the transverse plate 176 and the inlet end cover 282 is moveable toward the slots 188 and out of the cylindrical body 80. There is a minimal quantity of fluid between the rod side 206 at the transverse plate 176 and the control end insert 250. It is desirable to minimize the quantity of fluid that is between the transverse plate 176 and the control end insert 250. Static fluid may in some circumstances become a gas.

Positioning the piston head 170 in a position in which the slots 188 in the head end skirt 178 are axially positioned along the central axis 82 to be centered on the axially elongated slots 142 in the fixed distribution cage 130 will provide the maximum flow rate of a fluid such as anhydrous ammonia through open discharge ports 114. Maximum fluid flow rate is generally not desired. The piston head 170 and the piston shaft 212 are moved toward the inlet cover 282 to reduce the flow rate of fluid. The closer the piston head end 170 is to the inlet end cover 282 the slower the flow rate. When the rod ends 196 of the slots 188 are closer to the inlet end cover 282 than the inside arcuate ends 148 of the axially elongated slots 142 in the fixed distribution cage 130 the flow of fluid will be blocked.

A tool bar 386 employed to carry knives 388 that cut a slot in soil that receives anhydrous ammonia or other liquid fertilizer can take different forms. The tool bar may be a single bar supported by ground engaging wheels and pulled by a tractor or other suitable vehicle. Such a tool bar may be moveable up or down relative to the wheels to control the depth of penetration of the knives. These tool bars may have foldable wings that reduce the total width for transport on roads.

The tool bar 386 may be the tool bar disclosed in U.S. Pat. No. 5,540,290 to Peterson et al. the disclosure of which is incorporated herein by reference. The tool bar is mountable on a three-point hitch of a tractor. The tool bar has a center section attached to the hitch and moveable up and down by the hitch. One or more wings are pivotally attached to each end of the center section. The center section and the wings are transverse to the direction of forward movement of the tractor.

A plurality of row units 400 are clamped to the tool bar 386.

Each row unit 400 has a frame 402 clamped to a tool bar 386. A pair of spaced apart parallel upper links 404 are pivotally attached to the frame 402 by a pivot member 406. A pair of spaced apart parallel lower links 408 are pivotally attached to the frame 402 by a pivot member 410. Trailing ends of the upper links 404 are pivotally attached to a mast assembly 412 by pivot member 414. Trailing ends of the lower links 408 are pivotally attached to the mast assembly 412 by pivot member 416. The pivot members 406, 410, 414 and 416 cooperate with the frame 402, the upper links 404, the lower links 408 and the mast assembly 412 to form a pantographic linkage. The linkage permits up and down movement of the mast assembly 412 relative to the tool bar 386. A shank support bar 418 is pivotally attached to the mast 412. A spring steel bar 420 is clamped to the shank support bar 418 by a pair of U-bolts 422. A knife 388 is secured to the spring steel bar 420. A pair of gauge wheels 426 and 428 are journaled on arms 430 and control the depth of penetration of the knife 388 by following the surface of the ground and moving the mast 412 up and down relative to the tool bar 386. A disk coulter 432 is supported by the mast 412, positioned between the gauge wheels 426 and 428 and rotates about a transverse horizontal axis. The disk coulter 432 severs old crop material forward of the knife 388.

A depth control linkage assembly 434 adjusts the position of the position of the gauge wheels 426 and 428 relative to the mast assembly 412. An adjustable down pressure spring assembly 436 transfers weight from the tool bar 386 to the disk coulter 432 and the knife 388 when required by ground conditions. A spring adjustment assembly 442 adjust the down pressure exerted on the mast 412 by the springs 436. A spring trip assembly 438 permits the support bar 418 and the knife 388 to pivot upward and rearward when the knife 388 contacts an obstruction. U.S. Pat. No. 5,529,128 to Peterson et al., which is incorporated herein by reference, describes the depth control linkage assembly 434, the adjustable down pressure spring assembly, and the spring trip assembly 438 in detail. The number of row units 400 and the spacing between row units can be adjusted as desired. Each knife 388 is connected to a discharge port 114 of the variable orifice discharge assembly 50 by a fertilizer discharge line 440.

A fertilizer tank and trailer hitch assembly 450 is clamped to the tool bar 386 and extends rearward from the tool bar. The variable orifice discharge assembly 50 may be mounted on the hitch assembly 450, of the tool bar 386.

Figure 1:
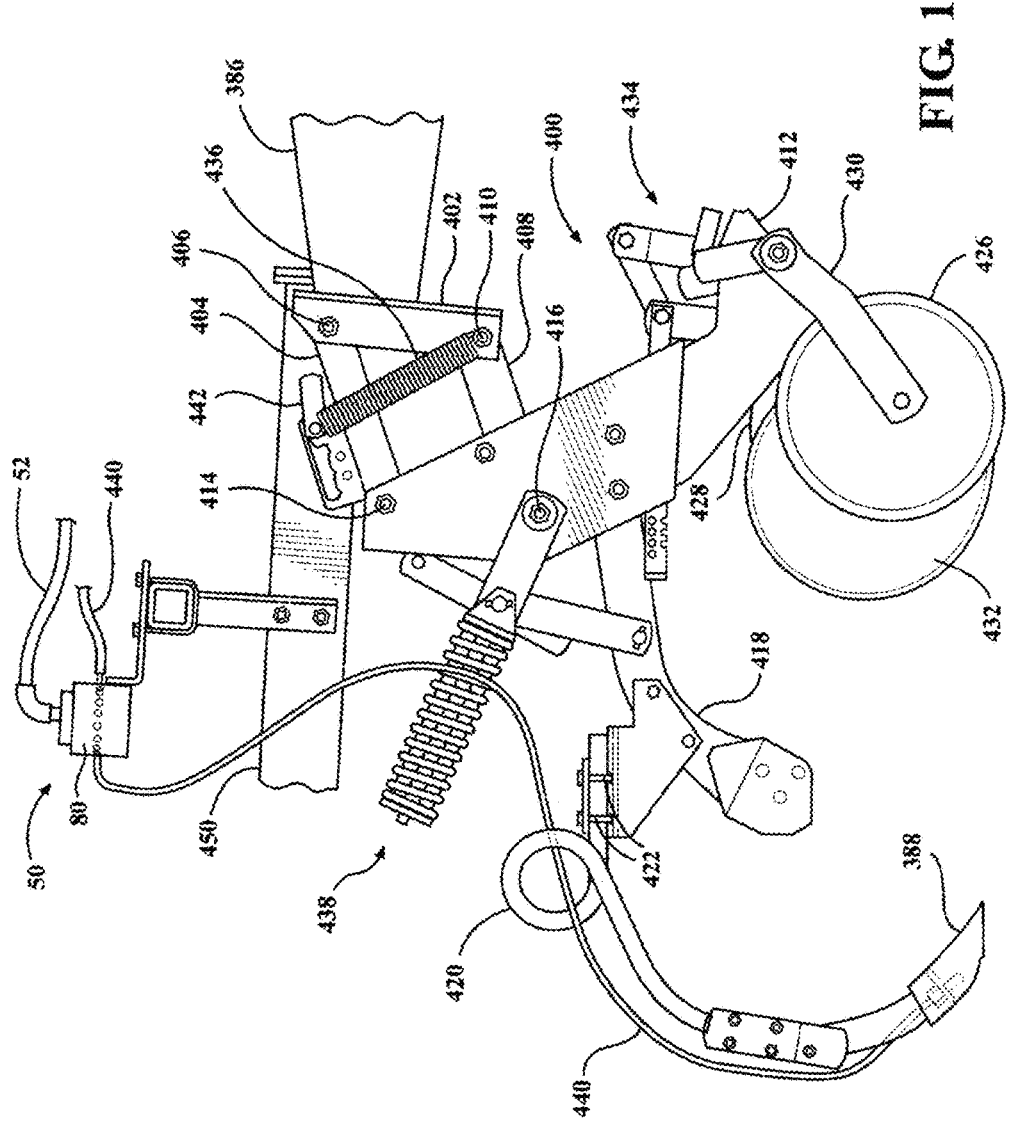
FIG. 1 is a perspective view of an anhydrous ammonia fertilizer knife, row unit and variable orifice distribution assembly, mounted on a tool bar with parts broken away.
Figure 21:
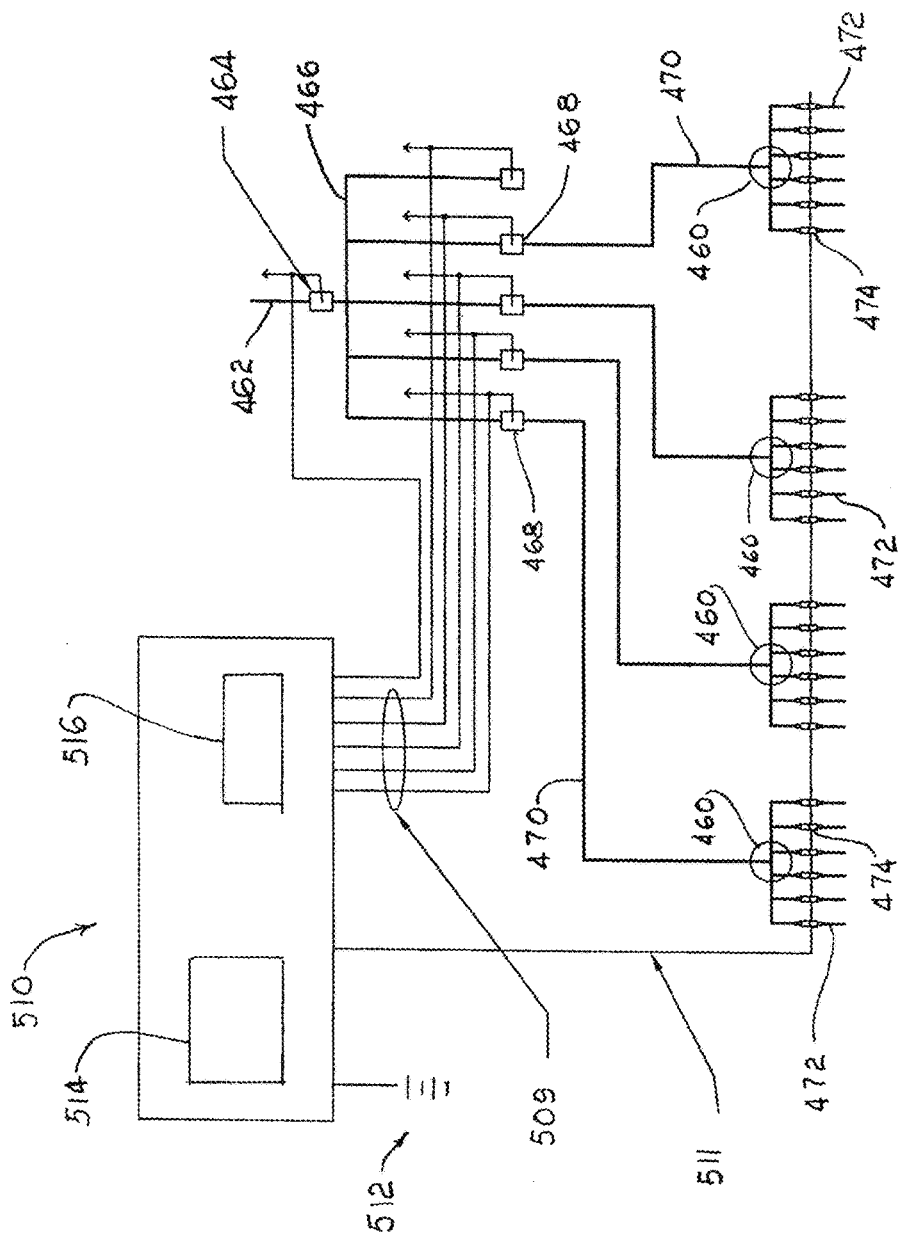
FIG. 21 is a schematic view of a control and monitoring system.
Figure 22:
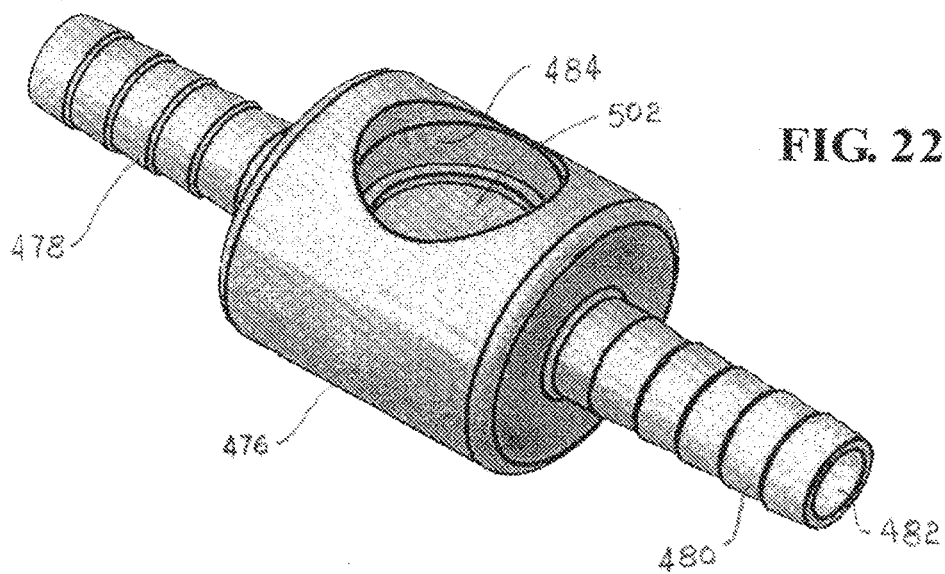
FIG. 22 is a perspective view of an enlarged aluminum sensor body.
Figure 23:
FIG. 23 is a perspective view of containment tube.
Figure 24:
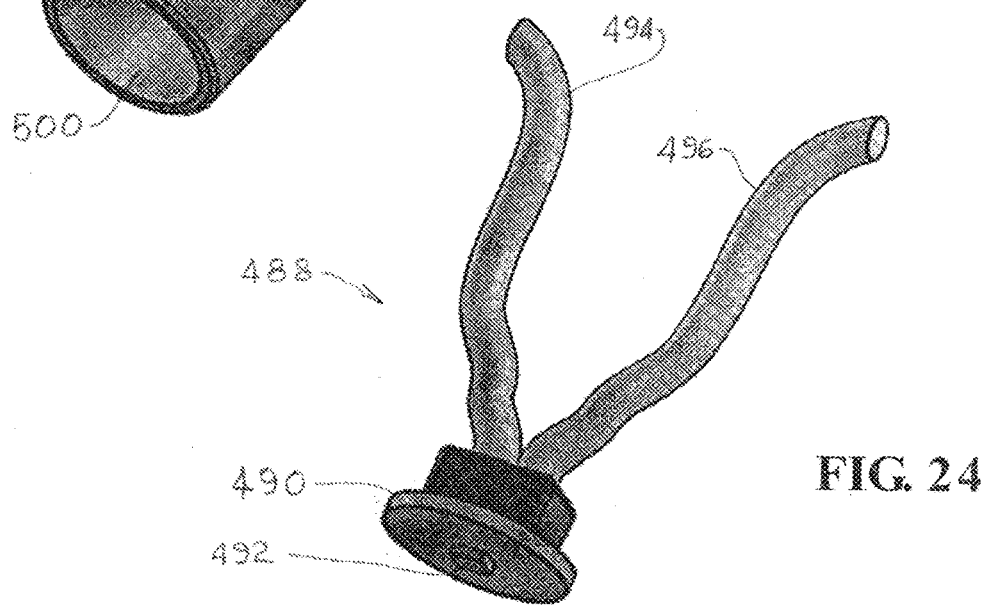
FIG. 24 is a perspective view of a temperature sensor assembly with a sensor, circuit board and two leads.
Figure 25:
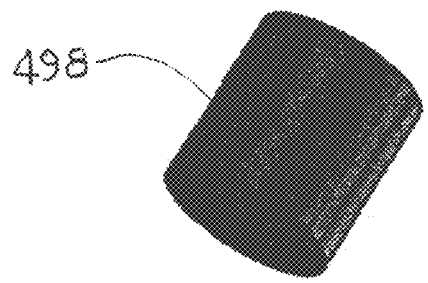
FIG. 25 is a perspective view of a sensor potting resin.
Figure 26:
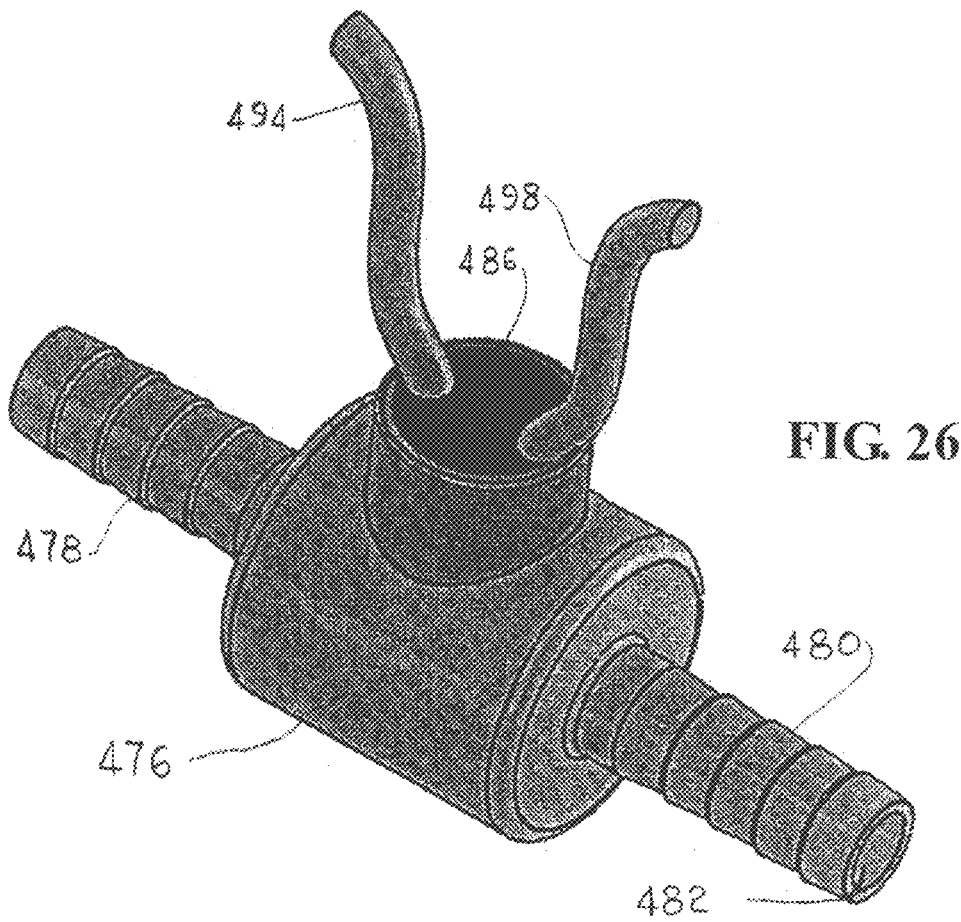
FIG. 26 is an enlarged perspective view of a temperature sensor.

The anhydrous ammonia fertilizer applicator monitor system shown schematically in FIG. 21 is usable with the anhydrous ammonia applicator described above. The control system has four section manifolds 460. Each manifold 460 may be any manifold that delivers fertilizer from one source evenly into a plurality of distribution lines 472. The schematic shows each manifold 460 receiving anhydrous ammonia through a line 462 from a supply tank such as the supply tank 40 shown in FIG. 20. A master shutoff valve 464 is opened to permit flow of anhydrous ammonia from the supply line 462 through lines 466 to four section control valves 468. Each of the control valves 468 controls the flow rate of anhydrous ammonia to one of the manifolds 460. One of the four lines 470 connects each control valve 468 to one of the manifolds 460. Each manifold 460 divides flow of anhydrous ammonia through six discharge lines 472. A discharge line 472 is connected to a knife such as a knife 388 shown in FIG. 1.

The number of manifolds 460 and flow control valves 468 is a matter of choice and the total number of knives to be mounted on one toolbar. Minimizing the total number of knives 388 connected to one manifold 460 and one control valve 468 should increase accuracy. However, the cost may be increased. Increasing the number of control valves 468 makes it easier to block flow to one or more manifolds to limit the application of anhydrous ammonia to areas more than one time.

A temperature sensor assembly 474 is mounted in each discharge line 472 a selected distance from each manifold 460. The temperature sensors assembly 474 detect anhydrous ammonia temperature changes promptly.

The temperature sensor 474 includes an aluminum body 476. The body 476 has a barbed inlet fitting 478 and a barbed outlet fitting 480. The anhydrous ammonia passage 482 extends through the entire body 476 and is coaxial with the inlet fitting 478 and the outlet fitting 480. The diameter of the passage 482 is substantially the same as the diameter of the passage through the discharge lines 472 to minimize turbulence in the flowing anhydrous ammonia. A sensor cavity 484 extends into the aluminum body 476 in a direction perpendicular to anhydrous ammonia passage 482. A containment tube 486 of polyvinyl chloride (PVC) is pressed into the sensor cavity 484.

A sensor unit 488 includes a printed circuit board 490, a temperature sensor 492 in the center of the circuit board, a first lead 494 and a second lead 496. The temperature sensor 492 is adhered to the aluminum body 476 at the bottom 502 of the sensor cavity 484. The printed circuit board 490 is centered relative to containment tube 486 and spaced from the anhydrous ammonia passage 482 by the aluminum body 476. The printed circuit board 490 and the containment tube 486 form a potting cavity 500. A low viscosity potting resin 498 is poured into the potting cavity 500 and cured. The first lead 494 and the second lead 496 both extend through the potting resin 498 and out of the free end of the containment tube 486. The second lead 496 is a ground.

Figure 27:
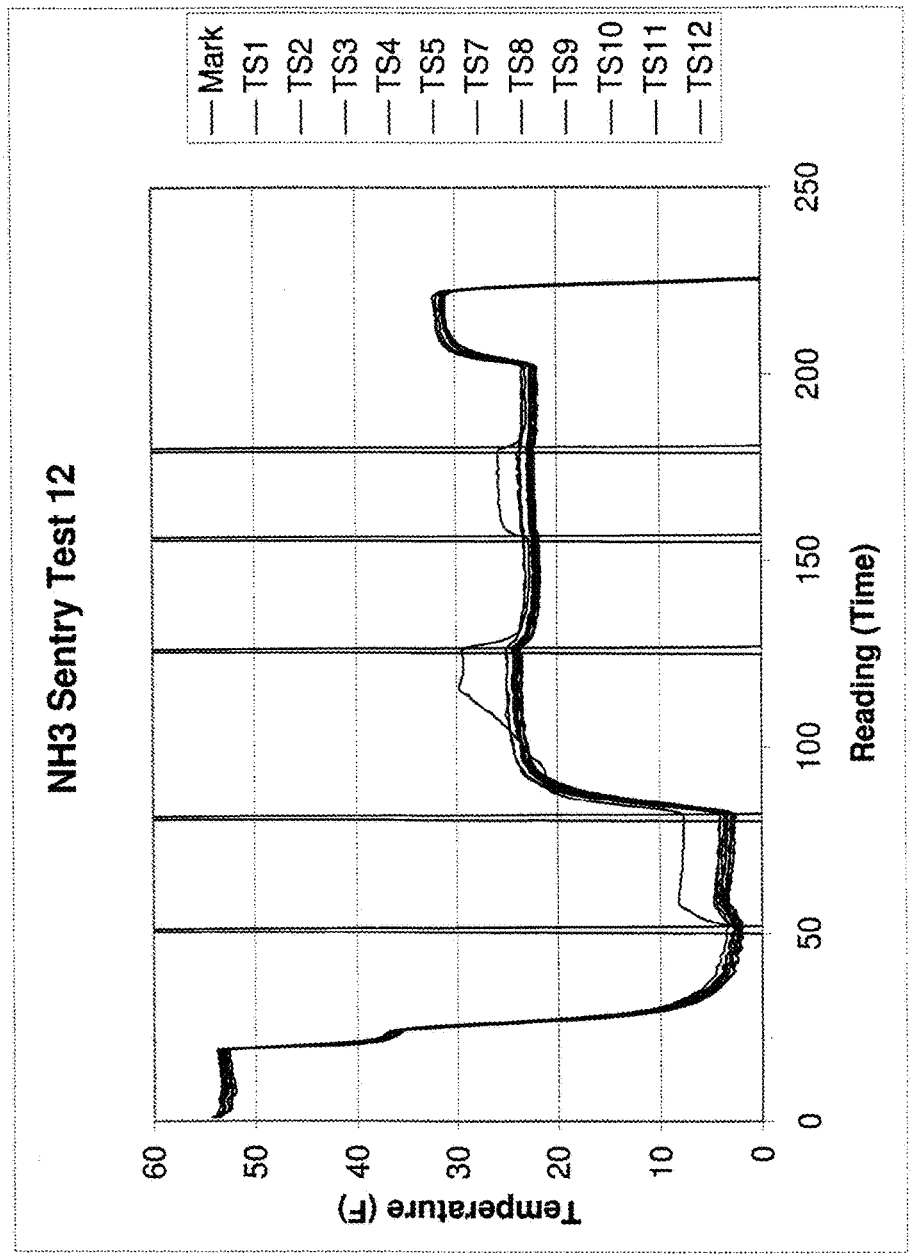
FIG. 27 is a graph of operation results of the temperature sensing and monitoring system of the anhydrous ammonia distribution and injecting system.
Figure 28:
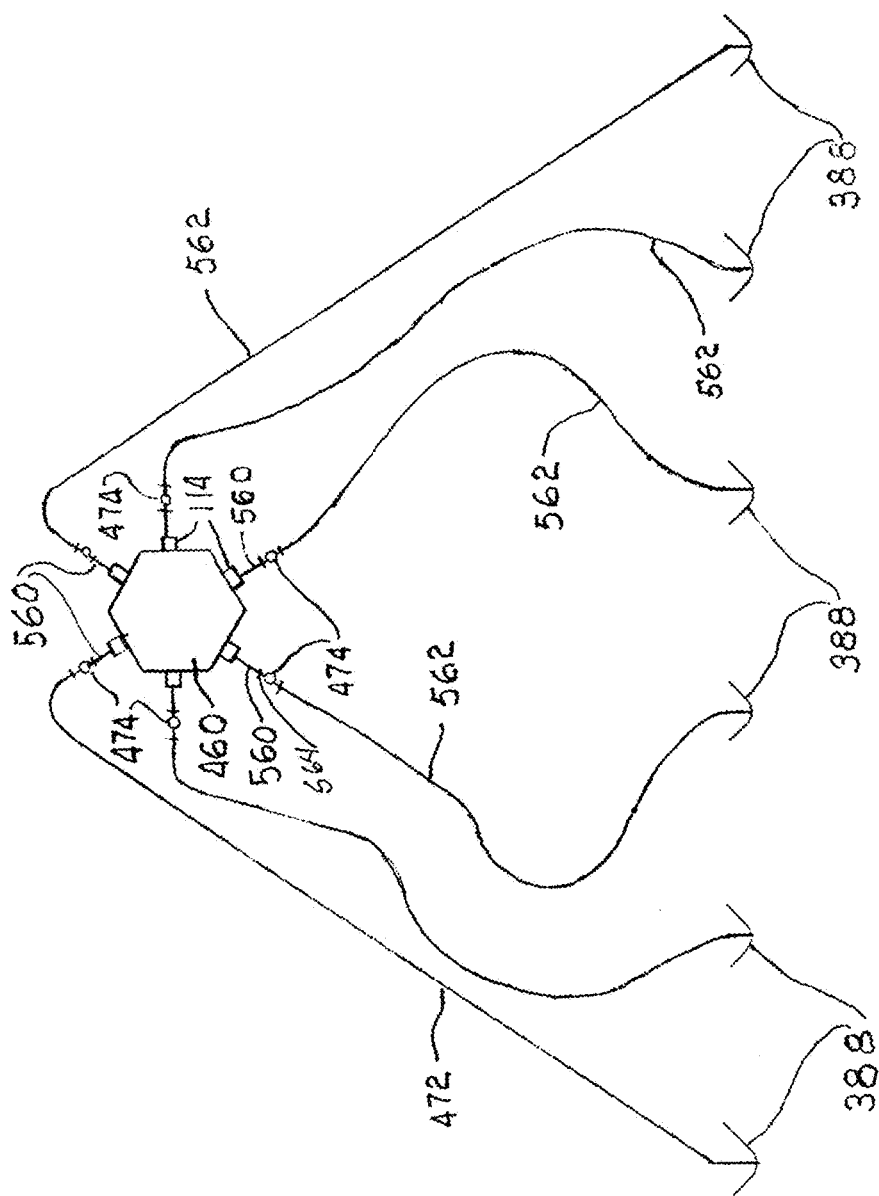
FIG. 28 is a schematic view of one distributor with a plurality of distribution lines each which is connected to one knife.

Each of the anhydrous ammonia temperature sensor assemblies 474 is connected to a monitor console 510 by a first lead 494. The temperature displayed on the screen 514 for each sensor is a different color or color shade. The chart on the right side of the monitor as shown in FIG. 27 converts the colors and color shades to a letter and numeric distribution identifier. Each monitor section 513 of an anhydrous ammonia fertilizer applicator, having a separate monitor section manifold 460, has a separate display area on the screen 514. The monitor system as shown in FIG. 21 has four monitor sections 513. Each of the four monitor sections 513 has a separate section manifold 460. The monitoring sections 513 all send information to the monitor console 510. The actual number of sections varies. The variations depend on the capacities of the section manifolds 460, the number of knives 388 and discharge lines 472, and choices made by the engineers and users of the operator.

The monitoring sections 513 are identical as shown in FIG. 21. Only one section of the control and monitoring system is described in detail.

The temperatures sensed by the temperature sensor assemblies 474 are substantially the same as the temperature of the anhydrous ammonia passing through or stopped in the anhydrous ammonia passage 482. Aluminum transfers heat rapidly. The temperature sensor 492 is in contact with the bottom 502 of the sensor cavity 484 and close to the anhydrous ammonia passage 482. A wire buss or lead 494 transfers a temperature signal from the monitor section 513 to the monitor console 510. A microprocessor, in the monitor console 510, energized by a direct current power source 512, starts displaying the temperatures measured by the temperature sensors 492 on a screen 514. The measured temperatures start when the master valve 464 is open, the section control valve 468 is open and flow of anhydrous ammonia starts. FIG. 27 is a sample display of results from a test with a section manifold 460. The test was run with twelve first leads 494 in one monitor line harness 511.

The starting temperature of anhydrous ammonia in each of a plurality of discharge lines 472 was nearly 53° F. (Fahrenheit). After the system was activated, the temperature dropped to about 3° F. At time 50 one discharge line 472 was closed to simulate a blocked line. The temperature in the blocked line 472 increased relative to the other lines. The blocked line temperature stabilized at 4° F. to 5° F. above the unblocked lines during the test. A 4° F. change is clearly observed on the screen 514. The temperature in the unblocked discharge lines 472 raised a few degrees and then stabilized.

At time 80 the flow rate was changed. The temperature of anhydrous ammonia measured by temperature sensor assemblies 474 in unblocked lines 472 increased and stabilized at about 25° F. The temperature measured by the sensor 474 in the blocked discharge line 472 rose at about the same rate as the other lines until the lines with free flowing anhydrous ammonia started to stabilize. The temperature in the blocked discharge line 472 increased at a slower rate, but continues up to almost 30° F. At time 135 the blocked discharge line 472 was opened. The temperature measured in the unblocked line dropped from 30° F. to about 23° F. The temperature in the discharge lines 472 that had not been blocked also dropped slightly. All lines were fully open and at a temperature of about 25° F. from time 130 to time 155. At time 155 a line 472 was slightly closed. The temperature in the partially closed line 472 increased to about 25° F. At time 180 the partially closed line 472 was fully open. The temperature in all lines 472 stabilized at about 22.5° F. A two-degree temperature change in one line 472 is clearly observable on the screen 514. At time 200 the valve 468 was closed. The temperature of anhydrous ammonia in all the discharge lines 472 increased. The sample test results were with one specific manifold 460 with an unspecified ambient temperature.

The microprocessor in the monitor console 510 compares the temperature of one temperature sensor assembly 474 with the calculated average temperature of all the other temperature sensor assemblies 474 connected to one manifold 460. The measured temperature of each of the sensor assemblies 474 in the monitor section is compared with the average temperatures of the other sensor assemblies. If a sensor 474 has a temperature above or below the calculated average that varies more than a selected amount Φ, a warning signal is provided for the operator. The operator can look at the screen 514 and determine which discharge line 472 is outside the selected deviation amount Φ. The lines representing individual temperature sensors 474 may be in different colors to identify each sensor in a section. The lines may also be identified by a number system or other indicia. The indicia chart on the face of the monitor, as shown in FIG. 27 converts the colors to an indicia that can be used on most fertilizer distributors.

The employment of current temperatures for all monitor functions corrects for ambient temperature changes during each twenty-four-hour period. The deviation amount Φ is set by the operator using a key pad 516 on the console 510. The key pad 516 or their controllers may also be used to open and close the master shutoff valve 464. Section control valves 468 used to set the application rate for anhydrous ammonia are each adjustable using the key pad 516. All of the section control valves 468 may be set to provide a uniform application rate. The tractor and the console may be equipped with a global positioning system and provided with soil sample data automatically adjust the application rate for each section control valve 468.

The monitor console 510 is to be mounted on the tractor in a position in which the operator can see the monitor console 510, the screen 514 and operate the control functions.

The anhydrous ammonia fertilizer distribution line monitor is described above as part of a fertilizer applicator with specific components between a supply vessel 40 and the manifold 460. A specific row unit 400 with a knife 388 is also described. The distribution line monitor with temperature sensors works well with substantially all commercially available anhydrous ammonia applicators.

The applicators can rely on the vapor pressure of anhydrous ammonia in the supply vessel 40 to move the liquid and any vapor that is created to the knife 388. The applicator can also include a pump that increases pressure to move liquid through a manifold and into distribution or discharge lines 472.

The manifold may be separate from a flow control valve that controls the rate of flow of anhydrous ammonia from the supply vessel 40. The manifold should be capable of supplying an equal quantity of fertilizer to each distribution line 440. Some manifolds have orifices that are changeable. These orifices should be the same size and in good working order. The orifices should be unplugged. Each distribution line 472 should receive substantially the same quantity of anhydrous ammonia at substantially the same rate of flow. The distribution lines 472 should have the same inside diameter and substantially the same length. The manifold may be made from any suitable material. The shape and size of the manifold is not important as long as flow of fertilizer is not impeded.

The spring steel bar 420 and knife 388 may be attached directly to a tool bar 386. The tool bar 386 may be supported by ground engaging wheels. The wheels may be moved relative to the tool bar to raise and lower the knives 388.

One or more anhydrous ammonia distributor manifolds 460 are employed on each fertilizer distributor. A distribution line 472 is attached to a manifold discharge port 114 and to an injector knife 388. There are multiple manifold discharge ports 114 in use on each manifold 460. Each distribution line 472 include a proximal line portion 560 attached to a discharge port 114 and a distal line portion 562 attached to a knife 388. A temperature sensor 474 connects the proximal line portion 560 to the distal line portion 562. The temperature sensor 474 includes a metal tube 566 with an inside diameter that is substantially the same inside diameter of the distribution line 472. The metal tube has a high rate of thermal conductivity. The upstream end 564 of temperature sensor assembly 474 is spaced from the manifold port 114 inside the proximal line portion 560 by about three inches so that the flexible plastic proximal line portion thermally isolates the temperature sensor 492 from the manifold 460.

The combined length of the proximal line portion 540, the metal tube 566 of the temperature sensor 474 and the distal end portion 562 is substantially the same as the length of the other discharge lines 472 connected to the same manifold 460.

A temperature sensor assembly 474 includes a temperature sensor 492 that measures the temperature of anhydrous ammonia in the metal tube 566.

We claim:

1. An anhydrous ammonia fertilizer distribution line monitor comprising:
   a plurality of anhydrous ammonia manifold discharge ports;
   a plurality of injector knives mounted on a tool bar;
   a plurality of tubular distribution lines each of which include a proximal line portion with an inlet end connected to one of the plurality of anhydrous ammonia manifold discharge ports and a distal line portion with an outlet end connected to one of the plurality of injector knives;
   a plurality of metal tubes each with an attached temperature sensor connecting the proximal line portion to the distal line portion of each of the plurality of tubular distribution lines, and spaced from the plurality of anhydrous ammonia manifold discharge ports;
   a monitor console that receives temperature data from each of the attached temperature sensors and provides a temperature display of each of the attached temperature sensors and an indicia identifier for each of the attached temperature sensors; and a microprocessor in the monitor console that compares a temperature measured by a selected one of the attached temperature sensors with an average temperature of the attached temperature sensors except the selected one of the attached temperature sensor and provides a warning when a temperature difference between the selected one of the attached temperature sensors and the average temperature exceeds a selected temperature difference.

2. The anhydrous ammonia fertilizer distribution line monitor of claim 1 wherein each of the plurality of metal tubes is an aluminum tube.

3. The anhydrous ammonia fertilizer distribution line monitor of claim 1 wherein the attached temperature sensor in each of the plurality of tubular distribution lines is spaced from the plurality of anhydrous ammonia manifold discharge ports a distance of at least three inches.

4. The anhydrous ammonia fertilizer distribution line monitor of claim 1 wherein each of the plurality of tubular distribution lines is a plastic tube.

5. The anhydrous ammonia fertilizer distribution line monitor of claim 1 wherein the microprocessor in the monitor console after determining if the selected one of the attached temperature sensors is in one of the plurality of tubular distribution lines with a measured temperature that is within the selected temperature difference, the microprocessor continues by selecting another one of the attached temperature sensors and repeating the comparison.

\* \* \* \* \*